United States Patent
Mason

(10) Patent No.: US 10,521,958 B2
(45) Date of Patent: Dec. 31, 2019

(54) COMPUTER HANDLING OF OBJECT SILHOUETTES

(71) Applicant: Electronic Arts Inc., Redwood City, CA (US)

(72) Inventor: Ashton Mason, Twickenham (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 53 days.

(21) Appl. No.: 15/872,181

(22) Filed: Jan. 16, 2018

(65) Prior Publication Data

US 2019/0221034 A1    Jul. 18, 2019

(51) Int. Cl.
*G06T 17/20* (2006.01)
*G06T 15/08* (2011.01)
*G06T 7/62* (2017.01)

(52) U.S. Cl.
CPC ............ *G06T 17/20* (2013.01); *G06T 7/62* (2017.01); *G06T 15/08* (2013.01)

(58) Field of Classification Search
CPC ............ G06T 17/20; G06T 7/62; G06T 15/08
USPC ........................................................ 345/420
See application file for complete search history.

(56) References Cited

U.S. PATENT DOCUMENTS

| | | | | |
|---|---|---|---|---|
| 6,587,104 B1 * | 7/2003 | Hoppe | ............... | G06T 17/20 345/423 |
| 2002/0149580 A1 * | 10/2002 | Perry | ............... | G06T 15/40 345/419 |
| 2014/0160121 A1 * | 6/2014 | Johansson | ............... | G06T 17/10 345/420 |
| 2015/0015577 A1 | 1/2015 | Mason | | |
| 2016/0292916 A1 | 10/2016 | Mason | | |
| 2016/0379406 A1 | 12/2016 | Le Geyt | | |
| 2017/0046874 A1 | 2/2017 | Mason | | |

OTHER PUBLICATIONS

Laurentini, Aldo. "The visual hull concept for silhouette-based image understanding." IEEE Transactions on pattern analysis and machine intelligence 16.2 (1994): 150-162. (Year: 1994).*
Garland, et al. "Surface Simplification Using Quadric Error Metrics" Carnegie Mellon University. 1997.

(Continued)

*Primary Examiner* — King Y Poon
*Assistant Examiner* — Vincent Peren
(74) *Attorney, Agent, or Firm* — Middleton Reutlinger

(57) ABSTRACT

A computer implemented method for determining a silhouette volume of a 3D object, e.g. for mesh simplification, comprises: receiving a computer representation of a 3D object; determining a silhouette volume of the object, wherein the silhouette volume is the maximal volume of space having a silhouette from every viewing direction which is identical to the silhouette of the object from the same viewing direction, and wherein points of the object which lie on the boundary of the silhouette volume also lie on the boundary of the object's projected silhouette from at least one viewing direction; determining, based on the silhouette volume, the extent to which features of the object are silhouette features; determining, for a plurality of planes and for a plurality of different axes, at least one intersection loop, wherein each intersection loop corresponds to a planar cross-section of the boundary of the object in its respective plane; and determining the convex hull of each intersection loop.

20 Claims, 16 Drawing Sheets

(56) References Cited

OTHER PUBLICATIONS

Garland, et al. "Simplifying Surfaces with Color and Texture Using Quadric Error Metrics" Carnegie Mellon University. 1998.
Daniels, et al. "Quadrilateral mesh Simplification" ACM Transactions on Graphics. 2008.
Silvennoinen, et al. "Occluder Simplification Using Planar Sections" Computer Graphics Forum. Dec. 15, 2013.
Cheung "Visual Hull Construction, Alignment and Refinement for Human Kinematic Modeling, Motion Tracking and Rendering" Carnegie Mellon University. Oct. 2003.

* cited by examiner

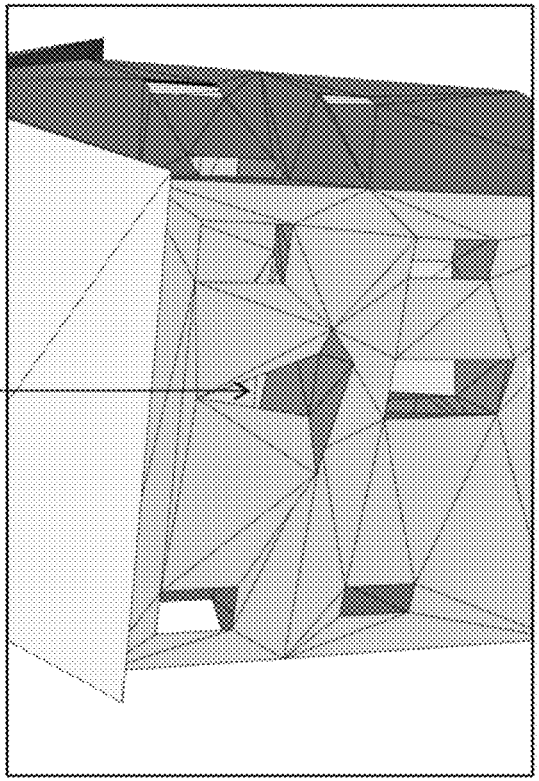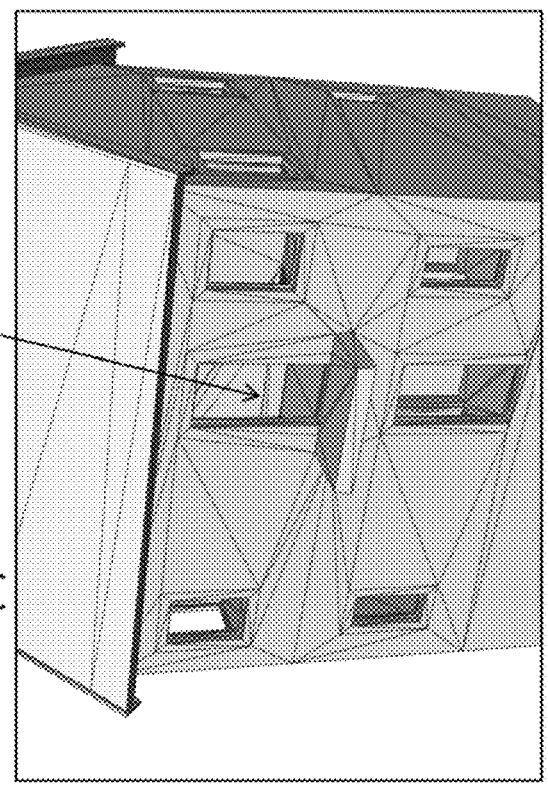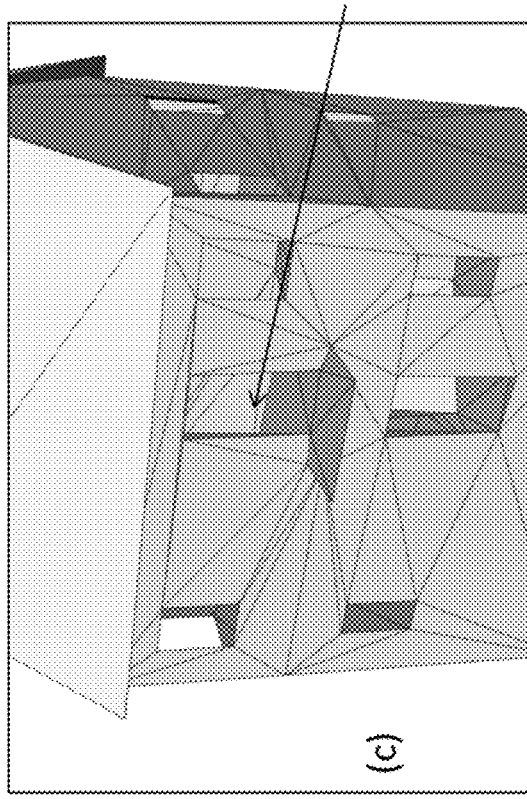
Figure 14

COMPUTER HANDLING OF OBJECT SILHOUETTES

FIELD

This specification relates to computer handling of object silhouettes.

BACKGROUND

Computer generated objects may be initially provided by an artist authored object. An artist authored object may have an initial level of detail. These initial artist authored objects may be required to be simplified in order to reduce the level of detail, depending on the given context within the virtual environment. The simplified versions resemble the original objects in some useful aspects. In the context of computer games, this is known as Level of Detail (LOD) generation. Simplification may be performed in order to meet a resource cost indicative of the processor and memory required to handle the object. The full resolution computer generated object may not always be needed, and so there are circumstances in which a lower resolution, simplified object will be more appropriate in order to reduce the resource cost.

In computer games and other areas, such as computer-aided manufacturing (CAM) processes, polygonal meshes may be used. A polygonal mesh may be a collection of vertices, edges, and faces that define the shape and/or boundary of an object. The faces may consist of various polygonal shapes such as triangles, quadrilaterals, convex polygons, concave polygons, regular polygons (e.g. polygons which may have equal length sides and may have equal angles) and/or irregular polygons (e.g. polygons which may not have equal length sides and may not have equal angles).

SUMMARY

A first aspect of this specification provides a method, performed by one or more processors, the method comprising:
receiving a computer representation of a 3D object;
determining a silhouette volume of the object, wherein the silhouette volume is the maximal volume of space having a silhouette from every viewing direction which is identical to the silhouette of the object from the same viewing direction, and wherein points of the object which lie on the boundary of the silhouette volume also lie on the boundary of the object's projected silhouette from at least one viewing direction; and determining, based on the silhouette volume, the extent to which features of the object are silhouette features.

Determining the boundary of the silhouette volume may comprise:
determining, for a plurality of planes and for a plurality of different axes, at least one intersection loop, wherein each intersection loop corresponds to a planar cross-section of the boundary of the object in its respective plane; and
determining the convex hull of each intersection loop.

The method may comprise:
classifying any 3D points which are located in or near a given plane, yet outside the convex hulls of the intersection loops formed within that plane, as being outside the silhouette volume; and
determining that any points not classified as outside the silhouette volume form part of the silhouette volume.

Determining the extent to which features of the object are silhouette features may comprise determining a distance of a feature from the boundary of the silhouette volume.

Determining the extent to which features of the object are silhouette features may comprise generating a signed distance field indicating the distance of 3D points from the boundary of the silhouette volume.

The method may comprise simplifying the object based on the extent to which features of the object are silhouette features. The visual fidelity of silhouette features may be preserved at the expense of visual fidelity of non-silhouette features.

The method may comprise determining a priority weighting for features of the object, wherein the priority weightings determined for features located on the silhouette of the object are determined to be higher than features which are not located on the silhouette of the object.

The method may comprise performing a simplification process on the object based on the priority weightings applied to the features of the object.

The method may comprise performing a simplification process based on a cost metric which determines the negative impact to the visual fidelity of the object of an available simplification operation, the cost metric including a term or factor to penalize simplification changes which affect silhouette features of the object to a greater extent than changes which affect non-silhouette features.

The computer representation of the object may comprise a polygonal mesh.

Identifying features of the object which are located on a silhouette of the object may comprise:
identifying mesh faces, edges and/or vertices which are located on the boundary of the silhouette volume of the object.

Determining the extent to which features of the object are silhouette features may comprise determining the distances of vertices, edges or faces of the polygonal mesh from the boundary of the silhouette volume of the object.

Determining the silhouette volume of the object may comprise:
generating a set of non-parallel projection axes;
for each axis A in the set of projection axes:
generating a series of parallel planes perpendicular to axis A at different positions along the axis A;
for each plane P in the series of parallel planes:
generating a set of intersection loops indicative of where plane P intersects the boundary of object O;
projecting the set of intersection loops to 2D in plane P;
discarding any projected loop enclosed within any other loop in 2D;
replacing all remaining loops with their corresponding convex hulls in 2D;
for each 3D point X not yet classified as outside the silhouette volume:
finding a plane R to which 3D point X is nearest;
projecting 3D point X to 2D in plane R; and if the projection of 3D point X to 2D in plane R is located outside all convex hulls of the intersection loops in plane R, classifying 3D point X as outside the silhouette volume of the object;
determining that any 3D points not classified as outside the silhouette volume of the object as forming part of the silhouette volume of the object.

The method may comprise determining whether changes to the object performed during a simplification operation would move points of the object outside of the silhouette of the object, and penalizing such changes to reduce chances of selection of such changes relative to other changes which do not move points of the object outside of the silhouette of the object.

Determining the silhouette volume of the object may comprise representing the object as a volumetric grid, and filling any unfilled regions of the volumetric grid that are completely enclosed by filled regions with filled voxels to produce a solid voxel volume;

extracting the boundary of the voxel volume as a closed mesh;

intersecting the boundary of the voxel volume with a plurality of 2D planes to form a plurality of intersection loops; computing the convex hulls of the intersection loops;

determining the voxels which lie near a plane yet outside its convex hulls;

determining that the remaining voxels are within or on the boundary of the silhouette volume of the object.

A second aspect of this specification discloses apparatus comprising one or more processors and a memory, the memory comprising instructions that, when executed by the one or more processors, cause the apparatus to perform: receiving a computer representation of a 3D object; determining a silhouette volume of the object, wherein the silhouette volume is the maximal volume of space having a silhouette from every viewing direction which is identical to the silhouette of the object from the same viewing direction, and wherein points of the object which lie on the boundary of the silhouette volume also lie on the boundary of the object's projected silhouette from at least one viewing direction; and determining, based on the silhouette volume, the extent to which features of the object are silhouette features.

The instructions, when executed by the one or more processors, may cause the apparatus to perform:
determining, for a plurality of planes and for a plurality of different axes, at least one intersection loop, wherein each intersection loop corresponds to a planar cross-section of the boundary of the object in its respective plane; and
determining the convex hull of each intersection loop.

The instructions, when executed by the one or more processors, may cause the apparatus to perform:
classifying any 3D points which are located in or near a given plane, yet outside the convex hulls of the intersection loops formed within that plane, as being outside the silhouette volume; and
determining that any points not classified as outside the silhouette volume form part of the silhouette volume.

This specification also discloses a non-transitory computer readable storage medium having instructions that, when executed by a processing device, cause the processing device to perform operations comprising:
receiving a computer representation of a 3D object;
determining a silhouette volume of the object, wherein the silhouette volume is the maximal volume of space having a silhouette from every viewing direction which is identical to the silhouette of the object from the same viewing direction, and wherein points of the object which lie on the boundary of the silhouette volume also lie on the boundary of the object's projected silhouette from at least one viewing direction; and determining, based on the silhouette volume, the extent to which features of the object are silhouette features.

BRIEF DESCRIPTION OF THE DRAWINGS

Embodiments of the specification will now be described, by way of example only, with reference to the accompanying drawings in which:

FIG. 14 is an illustration of an input mesh illustrates reduced overshadowing using a method in accordance with embodiments of the present specification;

DETAILED DESCRIPTION

Embodiments described herein involve identifying which features of a computer generated object are located on the silhouette of the object when the object is viewed from one or more angles. During simplification, these features located on or near the silhouette of the object may be preserved more, at the expense of detail in non-silhouette areas. As a result, the visual fidelity of the object overall may be higher than with conventional simplification methods. This is because the simplified versions of the object are typically used when the object is viewed as if from far away, and so are effectively seen mainly in silhouette.

The computer generated object may be, for example, a polygonal mesh. Mesh simplification may therefore be performed such that the resulting simplified mesh is better preserved, and so exhibits higher visual fidelity, in silhouette areas relative to non-silhouette areas.

Shadow meshes are specialized simplified meshes which are only used for casting shadows. In shadow meshes, the only detail which is important is the silhouette detail, and so anything not visible in silhouette may be greatly simplified or even removed without any loss of material content.

It will be understood that both shadow meshes and silhouette volumes differ from the known concept of a shadow volume, which is the representation of the 3D volume of a shadow cast by a light source in a rendered scene, and which, unlike a silhouette volume, does not resemble the objects in a scene, but instead represents a region of mostly empty space.

Embodiments described herein may also help to avoid over-shadowing in which a simplified version of an object casts a shadow in places where the original object did not. For example, a simplified version of an object may cut across a hole such as a window or arch, obscuring the view through it. Embodiments described herein provide a way to identify when changes to the object will cause this to happen, and to what extent. Changes which may lead to overshadowing may be penalized in terms of a cost metric in order to reduce overshadowing by simplified versions of objects.

Embodiments described herein may define a useful region of 3D space in and around an object referred to herein as the silhouette volume of the object. This region of space has the useful property that points on the object that lie on the boundary of the silhouette volume also lie on the boundary of the object's silhouette, when viewed from at least one possible angle. The silhouette volume may therefore be built in embodiments according to the present disclosure in order to identify features of the object which lie on the silhouette from at least one angle, and hence may be considered to be "silhouette features", as described in more detail herein.

Figure 1:
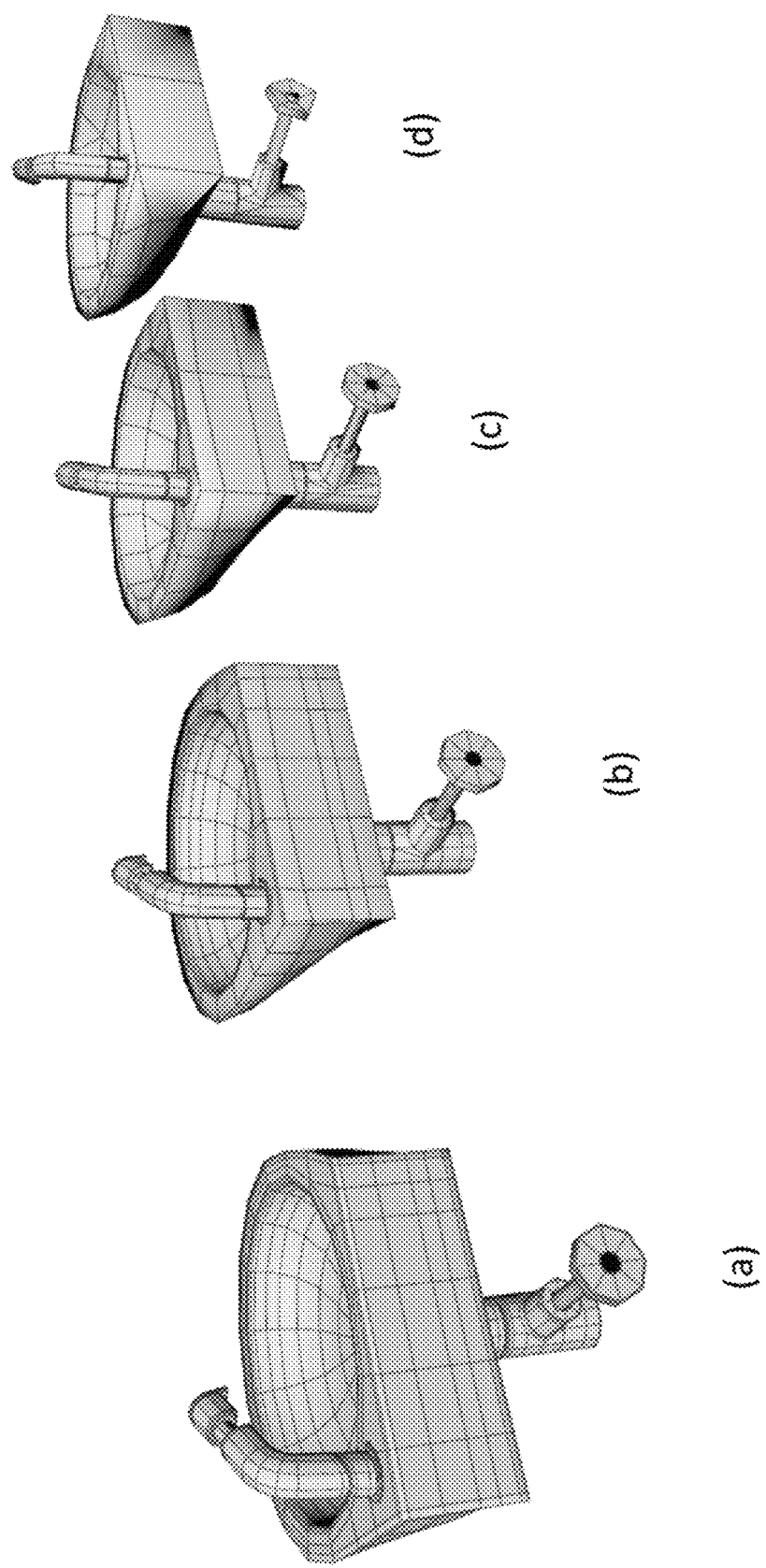
FIG. 1 illustrates object simplification.

FIG. 1 illustrates object simplification according to embodiments of the present specification. FIG. 1 illustrates a computer generated object in a number of different resolutions. In this example, the object is represented as a polygonal mesh. However, it will be recognized that the object may be represented in any suitable form. In this example, the object is a sink or wash basin. However, it will be recognized that in the embodiments described herein, the object may be any computer generated object. In image (a), the original, artist-authored, object is formed from a high resolution mesh. In image (b), the object is formed from an automatically generated lower resolution mesh, which has been simplified with respect to the higher resolution mesh. The object in image (a) therefore displays a greater level of detail LOD compared to the object depicted in image (b). The generated object in image (c) is of a resolution lower than both (a) and (b), and the resolution of the generated object in image (d) is even lower compared to the objects of (a), (b), or (c).

The meshes illustrated in FIG. 1 include multiple vertices, edges, and faces. In this example, the meshes are formed from a plurality of quadrilateral faces. However, it will be recognized that the meshes may be formed of any regular or irregular polygons, including triangles, rather than always just quadrilateral polygons.

As can be seen in FIG. 1, the object in image (b) includes a smaller number of polygons than the object in the higher resolution object in image (a), and the object in image (c) includes a smaller number of polygons than the objects in images (a) and (b). The object in image (d) includes a smaller number of polygons that object in any of images (a), (b), or (c). The overall size of the object remains the same. The polygons of the object in image (b) are larger in size than polygons in the object of image (a). The polygons in image (c) are larger in size than the polygons in the object of image (b). The polygons in image (d) are larger in size than the polygons of image (c)

In general, object simplification, including mesh simplification can be performed in a number of ways and according to a number of different algorithms. As described above, simplification is performed to reduce a resource cost of the object, where, for the case of mesh simplification, a greater number of polygons in the mesh corresponds to a greater resource cost. When mesh simplification is performed, the number of faces, edges, and vertices in the polygonal mesh are reduced. This allows the polygonal mesh to be stored using less space and may allow a computing device to render the polygonal mesh more easily and may allow a computing device to use fewer computing resources (e.g. using less processing power, less memory, etc.) when rendering the polygonal mesh. As a result, the simplified mesh is less expensive to store, process, render, etc. As used herein, the term "resource cost" is used to refer to the cost of computing resources in terms of storage, processing, rendering etc.

Simplification of the object may be based on a cost metric which measures the net negative impact to the fidelity of the object of an available simplification operation. In this context, from herein, the term "cost" is used to indicate the negative impact to the fidelity of the object, in contrast to the previously described "resource cost". In mesh simplification, simplification operations often involve collapsing mesh edges, that is, where one mesh edge is locally replaced with a vertex. Other operations for simplification may also be available. In embodiments described in the present specification, multiple edges may be collapsed at once. For meshes formed of a plurality of quadrilateral faces, collapsing multiple edges at once, in a single operation, helps to preserve the quadrilateral structure of the mesh.

The cost metric is used to prioritize the next available operation to collapse the edges of a mesh during simplification. Therefore, a processor used to perform the simplification operation may be configured to automatically select the next candidate edge for collapsing. The cost metric measures the deterioration of the visual fidelity of the mesh that would result from a collapse. Some edges may be more important to a mesh, in that collapsing such edges would cause damage to the integrity of the mesh. For example, a long edge on the front wall of a house matters more than a very short edge on a window sill on a second floor. The available candidates for edge collapse are stored in a memory in a priority queue. A priority queue is a queue sorted according to the cost. The first item of the priority queue is always the candidate of the queue having the lowest cost.

During simplification, the processor is configured to select the edge candidate at the front of the queue at each simplification step. The selected edge candidate is collapsed. The collapse changes the mesh locally around the collapsed edges. Following collapse of the selected edge, the processor is configured to update the queue by removing any candidates which are no longer available, and by adding any new available edge collapse candidates. In addition, the costs of the available edge collapses are recomputed for any changes to the cost.

The cost metric used for simplification may include any suitable cost metric terms. Commonly, the cost metric may be largely based on the Quadric Error Metric originally proposed by Heckbert and Garland. This metric estimates the negative impact of a single edge collapse on the geometric and visual fidelity of the mesh. The metric is configured such that a higher cost is computed for collapses that would deteriorate the mesh to a greater extent. Therefore, such collapses are penalized in terms of their cost. Therefore, during simplification, the likelihood of their selection is reduced as they are less likely to be at the front of the priority queue, if there are candidates with a lower cost which would deteriorate the mesh to a lesser extent. The cost penalty applied to such edges is performed according to a determined "importance" of the edge. For example, longer edges are determined to be more important than shorter edges, and edges in areas of high curvature are determined to be more important that edges in areas of low curvature.

As set out in more detail below, in the present embodiments, simplification is performed while preserving the silhouette features of the object. Therefore, features which are further away from the silhouette may include fewer polygons, relatively speaking, than features of the mesh which are located on the silhouette, after mesh simplification is performed according to the present embodiments.

The cost metric, such as the Quadric Error Metric described above, is extended with an additional term configured to penalize, in terms of cost, collapses of silhouette edges. Therefore, the silhouette edges are preserved during simplification as collapse of silhouette edges are associated with a correspondingly greater cost than non-silhouette edges.

In some embodiments according to the present disclosure, the degree to which a feature can be considered to be "silhouette" may be calculated based on the vertices of the feature. Other features can be determined to be silhouette or not by inspection of their vertices in any suitable way.

Determining silhouette features based on the vertices comprises classifying which vertices lie on the silhouette of an object from at least one viewing direction. Vertices that lie on the silhouette of an object are referred to herein as "silhouette vertices". That is, the projections of such silhouette vertices lie on the boundary of the projected silhouette of the object from at least one viewing direction. It will be understood that edges and/or faces of the mesh may be utilized in addition to, or instead of, vertices.

Figure 2:
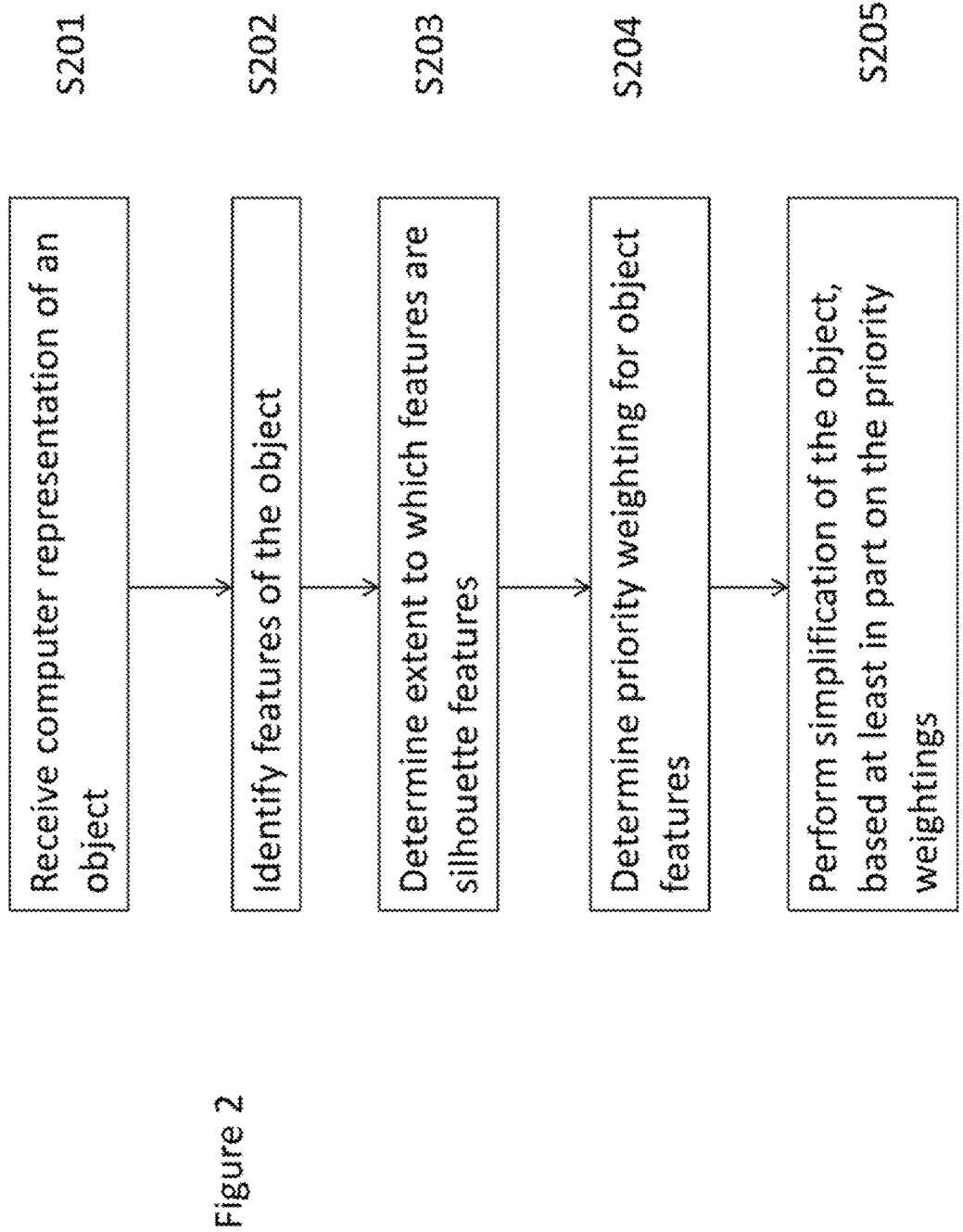
FIG. 2 is a flow chart illustrating a method of mesh simplification according to embodiments of the present specification.

FIG. 2 is a flow chart illustrating steps of a method which may be performed in accordance with embodiments of the present specification. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

The method may be performed by processing logic that comprises hardware (e.g. circuitry, dedicated logic, programmable logic, microcode, etc.), software (e.g., instructions run on a processor to perform hardware simulation), or a combination thereof.

In step S201, the method comprises receiving a computer representation of an object. The computer representation of the object may comprise a polygonal mesh. The polygonal mesh may be formed of polygons of any suitable size and shape. In some examples, the mesh may be formed of triangles. In other examples, the mesh may be formed of quadrilaterals. In other examples, the mesh may be formed of polygons having any suitable number of vertices and edges. However, it will be recognized that the computer representation of the object may be any suitable representation, and is not limited to being a polygonal mesh.

In step S202, the method may comprise identifying features of the polygonal mesh. This step may be performed by identifying mesh features such as vertices, edges, or faces, if the object is a polygonal mesh. In this case, the features may be recorded as a list of vertices of the object which may be stored in a memory as part of the computer representation of the object.

In step S203, the method may comprise determining the extent to which features are silhouette features, i.e. which are located on the boundary of silhouette of the object when viewed from one or more angles. If the object is a polygonal mesh, then the vertices, edges and/or faces may be the features of the mesh analyzed to determine the extent to which they are silhouette. An example of how the vertices located on the silhouette are identified is described in more detail below. An example of silhouette vertices and non-silhouette vertices is described in more detail below with reference to FIG. 3.

In some embodiments according to the present disclosure, in order to identify the silhouette features of the object, a silhouette volume is determined. Determining the silhouette volume of the object may comprise forming a large number of planar cross-sections of the boundary of the object. Each planar cross-section captures the extracted cross-section of the boundary of the object in that plane.

Once intersection loops characterizing the intersection of a plane with the boundary of the object have been computed, they form a set of closed loops projected in 2D in the intersecting plane. The loops may then be replaced with corresponding computed 2D convex hulls. These convex hulls may then be used to categorize areas of space within the plane that lie outside all convex hulls as outside the silhouette volume of the object.

Determining the intersection loops and convex hulls is described in more detail below with reference to FIG. 5.

Referring again to FIG. 2, in step S204, the method comprises determining priority weightings of the features of the object. The priority weighting of the features located on the silhouette may be determined to be higher than those of features which are not located on the silhouette. The priority weighting of the features may decrease together with an increasing distance from the silhouette of the object. Therefore, the priority weightings of the features may be determined such that the features on the silhouette are weighted greater than features not located on the silhouette. As described in more detail below, distances of points in a useful area of space from the boundary of the silhouette volume may be represented by a silhouette field. The silhouette field may then be used to determine the priority weightings of the features such that features located on or very near the silhouette have a higher weighting than features located away from the silhouette of the object. In this way, the extent to which features of the object are silhouette features can be represented by the distance of the feature from the boundary of the silhouette volume.

In some embodiments, the computer representation of the object is a polygonal mesh. In such examples, the features for which priority weightings are determined may be mesh features such as edges or vertices. The features that lie on the silhouette of the mesh from one or more angles are determined to have a higher priority than other features that are not on the silhouette. Therefore, features which are on the silhouette are less likely to be selected for simplification (or edge collapse) than features which are not on the silhouette of the object in the following step S205.

In step S205, the method may comprise performing simplification of the object, based at least in part on the priority weightings. In this way, the silhouette features may be better preserved compared to the non-silhouette features.

In the case that the computer representation of the object is a polygonal mesh, the step comprises performing mesh simplification of the polygonal mesh, where features such as edges may be collapsed or otherwise simplified based on the priority weighting of those features. As higher priority is given to features on the silhouette, during simplification, silhouette features are preserved at the expense of fidelity of mesh features that are not on the silhouette.

Figure 3:
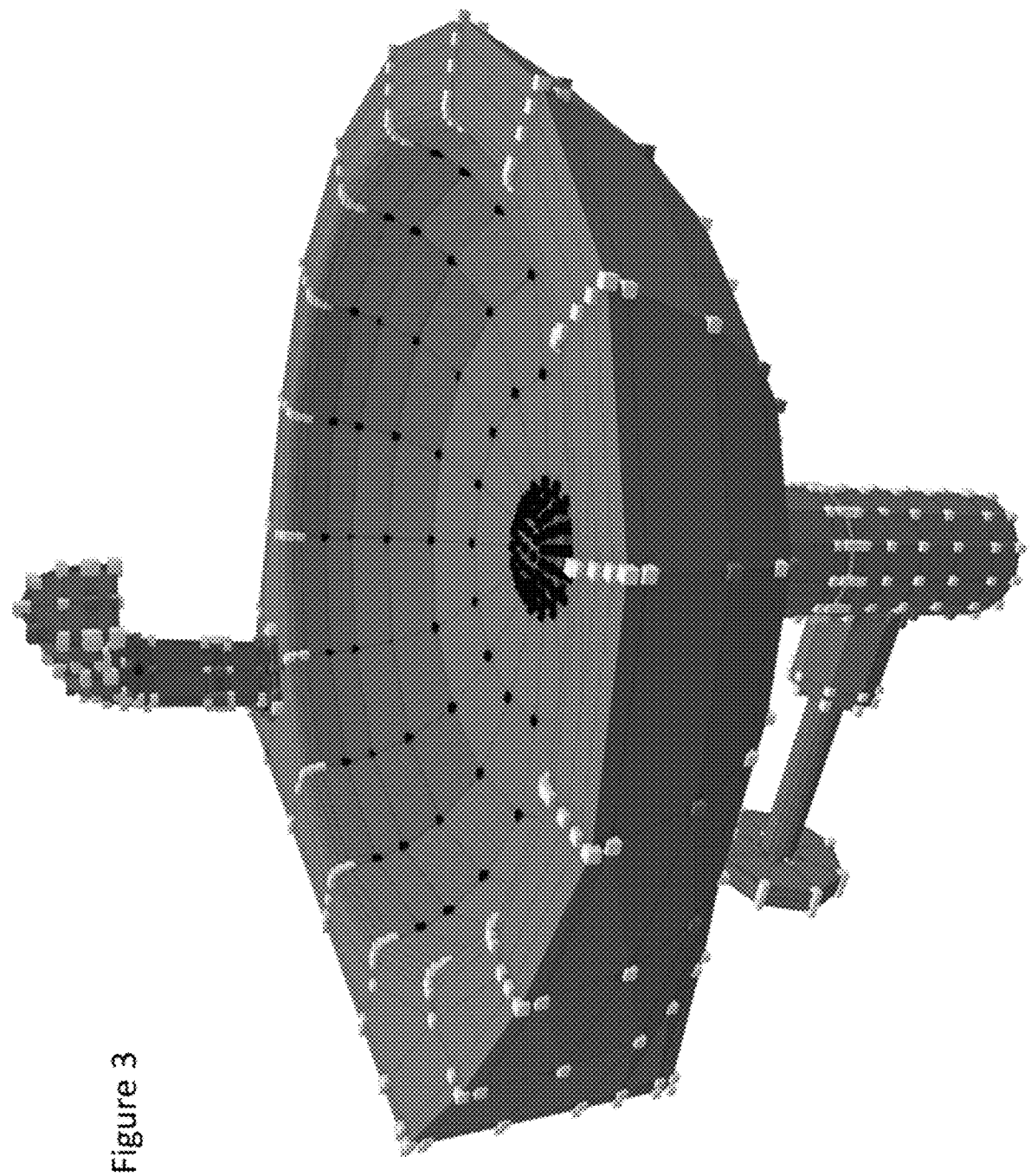
FIG. 3 illustrates a computer generated object and its silhouette vertices according to embodiments of the present specification.

FIG. 3 illustrates an example of an object for which silhouette vertices have been identified. In the example of FIG. 3, the object is a sink. In this example, the silhouette vertices are indicated by white markers, and vertices which do not form the silhouette are indicated by black markers. As can be seen, the hollow region forming the basin of the sink does not affect the silhouette from any angle, and so the vertices in this region are not determined to be silhouette vertices. However, the vertices indicated by the white markers will form the silhouette of the object when the object is viewed from at least one angle.

The silhouette volume of a shape in the context of this specification may be considered to be the maximal shape (i.e. largest, or with greatest internal volume) that would cast the same silhouette as the original shape, from every conceivable angle. The silhouette volume is typically similar in overall shape, and identical in silhouette, to the object whose silhouette it captures, but is typically simpler, or more locally convex, in the sense that all concavities that can safely be filled in without altering the silhouette have been filled in.

The silhouette volume of an object has the property that points of the object which lie on the boundary of the silhouette volume also lie on the boundary of the object's projected silhouette, from at least one viewing direction. It follows that any changes made to the object in the name of simplification can be guaranteed to not alter its silhouette, as long as they don't alter or deteriorate features that lie on the boundary of the silhouette volume.

Figure 4:
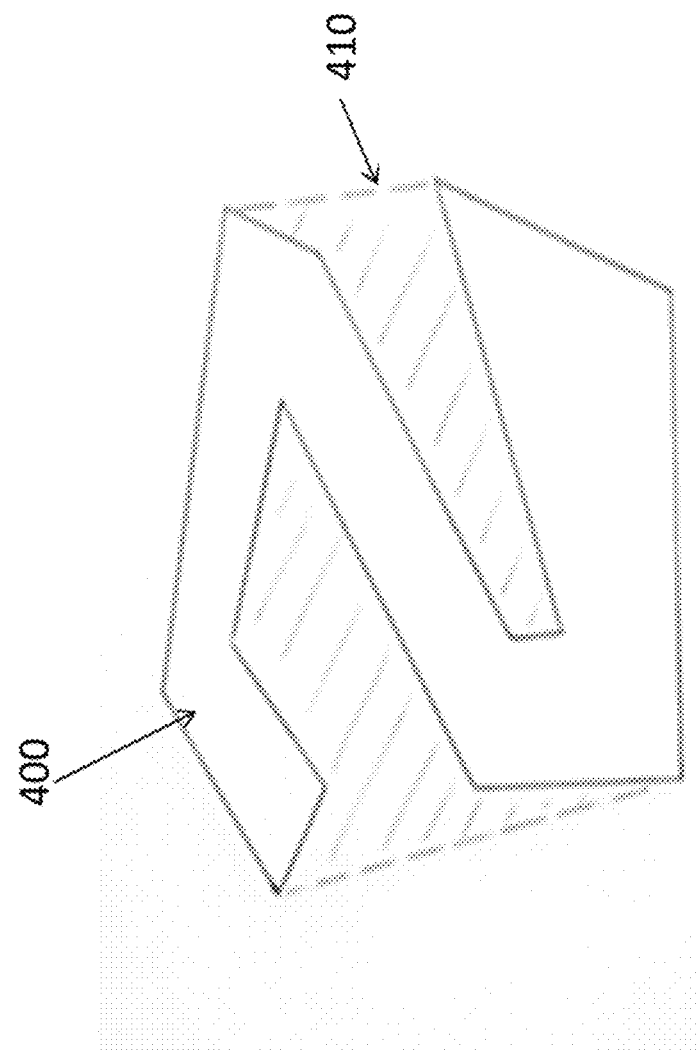
FIG. 4 is an illustration of a convex hull of a 2D object according to embodiments of the present specification.

For 2D shapes, the silhouette volume is simply the convex hull of the shape, because sight lines are straight. The convex hull of a shape is the smallest convex volume that entirely encloses the shape. Concavities are removed in the hull, reflecting the fact that sight lines can't enter concavities and return, but rather can only pass over them. This is shown in the example of FIG. 4, where the shape 400 has a convex hull 410. The convex hull 410 includes the shaded area and the area of the shape 400. The convex hull 410 is defined by the outer perimeter of the shape 400. In particular, the convex hull 410 is made up in part by the outer perimeter of the shape 400 and in part by straight lines that connect parts of the outer perimeter such as to eliminate (cut off) concave features.

Figure 5:
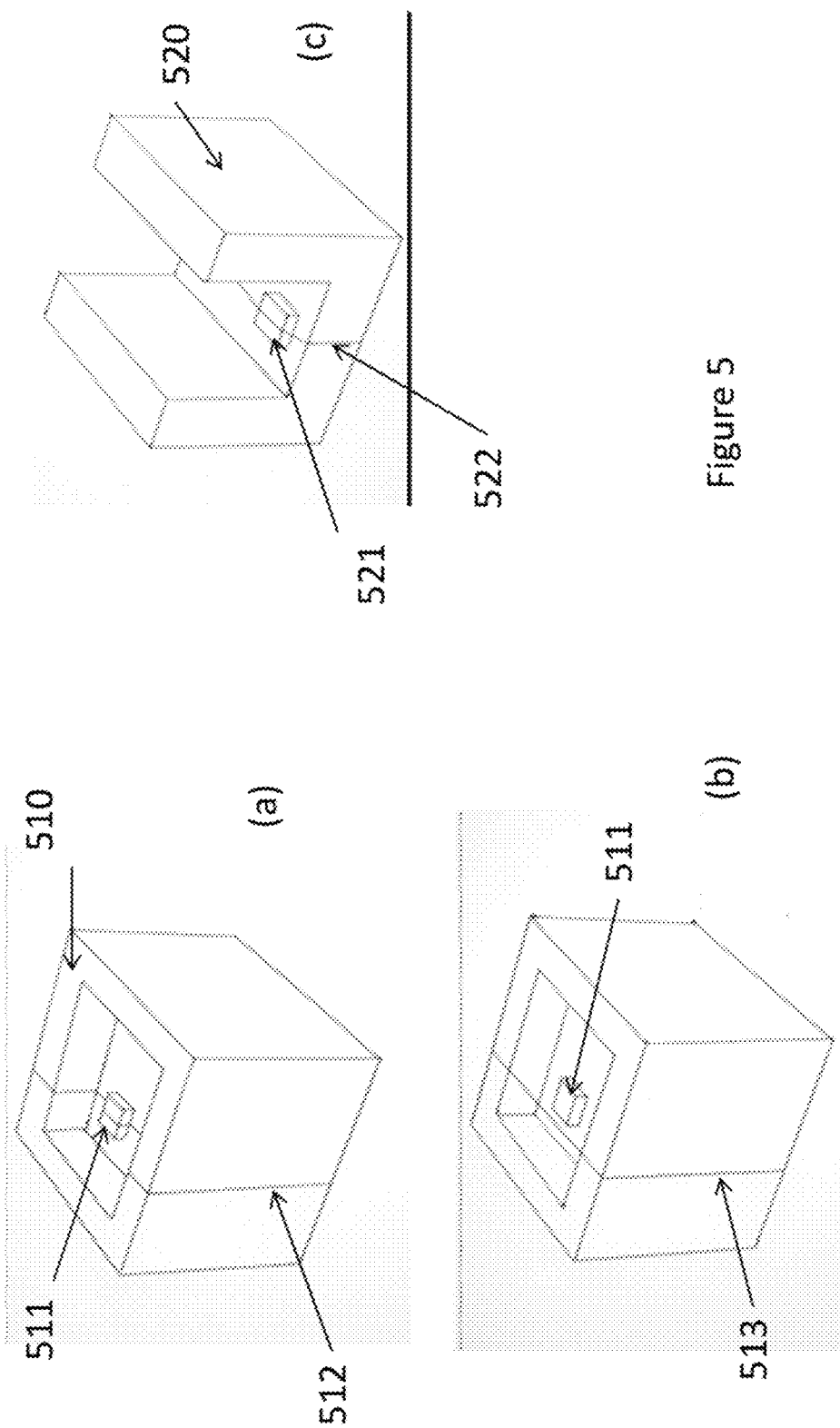
FIG. 5 is an illustration of two different 3D objects and the convex hulls of intersection loops formed by intersecting planes, according to embodiments of the present specification.

FIG. 5 illustrates the more complex example of two different 3D shapes, and how their silhouette volumes may differ from each other. The examples in FIG. 5 serve to show that the silhouette volume of a 3D shape is not in general identical to the convex hull of the shape. Image (a) of FIG. 5 illustrates an example 510 of a 3D shape whose silhouette volume is identical to its convex hull. The silhouette volume, being identical to the convex hull, omits the concavity in the upper surface of the cube, and the smaller block-shaped convexity 511 nestled within it. The small block 511 lies entirely within the silhouette volume of the shape 510, and accordingly it does not lie on the silhouette of the shape at all from any angle. The small block 511 can therefore be simplified or removed completely without affecting the silhouette of shape 510 from any angle.

In order to identify silhouette features of a 3D object, a large number of planar cross-sections of the object may be computed. As described above, each planar cross-section may capture the extracted cross-section of the boundary of the object in that plane. Each planar cross-section serves to elucidate the silhouette volume of the 3D object, within that plane. This exploits the observation that the silhouette volume of a 2D shape is just its convex hull. In this case, the 2D shape is just the cross-section of the 3D object in a plane, and the convex hull of the 2D cross-section describes a corresponding cross-section of the object's silhouette volume, in the same plane. By computing a large number of planar cross-sections of a 3D object, on different axes, and forming their respective convex hulls, an accurate picture of the shape of the object's silhouette volume may be built up in the limit.

In image (a) of FIG. 5, the intersection loop 512 formed by cross-section of block 510 with a single plane is illustrated. In the next image (b) of FIG. 5, the intersection loop 512 has been replaced with its convex hull 513 in the 2D plane. It may be inferred that the silhouette volume of the 2D shape corresponding to intersection loop 512 is just the convex hull 513, since the silhouette volume of a 2D shape is its convex hull. Effectively this reflects that no straight, infinite, lines of sight contained in the intersecting plane are able to hit the nested smaller block 511. By accumulation of similar arguments, in other planes at different orientations and offsets, it can deduced that the silhouette volume of 3D object 510 is identical to its convex hull, and specifically, omits the concavity containing the smaller block 511. From this it may be deduced that the small block 511 is not a silhouette feature of object 510 in image (a) of FIG. 5, and does not lie on its silhouette from any angle.

The example of shape 520 shown in image (c) of FIG. 5 is slightly more complex than the example given in relation to shape 510 shown in images (a) and (b). This is because the small block 521 does lie on the silhouette of the shape 520 from some angles. Therefore, some features of block 521 cannot be altered without impacting the silhouette of shape 520, and so block 521 is considered to be a silhouette feature. This reflects the fact that there exist straight, infinite, sight lines that are able to hit the small block 521, and are otherwise unoccluded. Note that the small block 521 lies on the 2D convex hull 522 of the intersection loop formed by cross-section with the same plane as in images (a) and (b). In this case the convex hull 522 serves to classify most of the space above it within the U shape as outside the silhouette volume, reflecting the fact that sight lines in the plane are able to pass through the gap between the uprights of the U. By considering convex hulls of cross-sections in many different planes, we can show that the silhouette volume of 3D object 520 is not simply its convex hull but rather is some more complex, concave shape.

In some examples, the boundary of a shape may be extracted as a mesh. The mesh may be intersected with a given plane to compute a cross-section in the form of a set of intersection loops. As shown above in relation to FIG. 5, intersection loops are closed lines representing the lines where the faces of the mesh intersect the plane. Where the shape is already a well-formed manifold mesh, the mesh itself may be directly intersected with the plane.

Where the shape is a mesh which is not closed, or not well-formed, the intersection with the plane may be aided by conforming a closed, well-formed mesh to the existing mesh specifically for the purposes of intersecting it with a plane.

Figure 6:
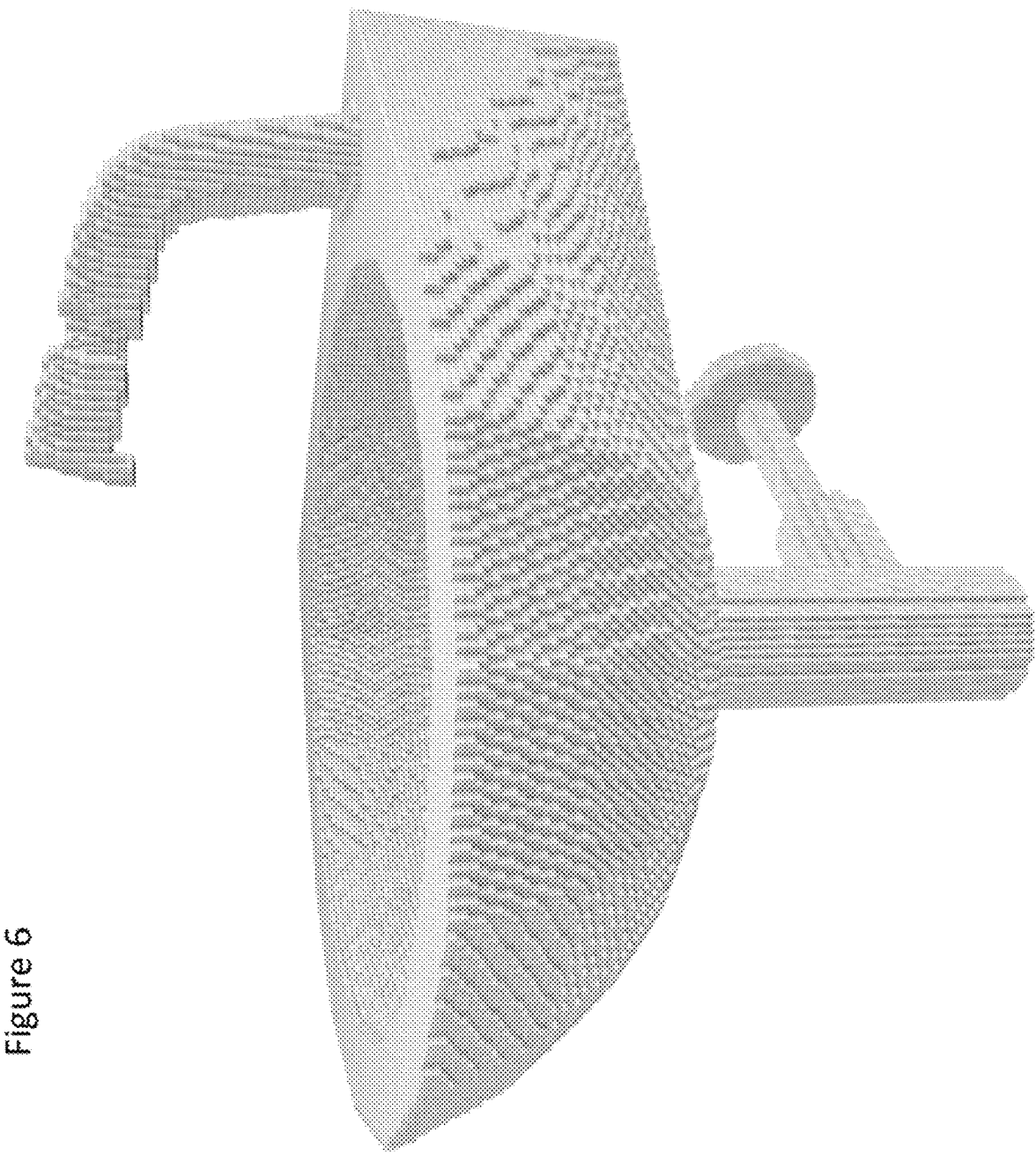
FIG. 6 is an illustration of a mesh represented by voxels according to embodiments of the present specification.

Forming such a mesh for the purposes of intersecting it with a plane may, in some examples, be done by rasterizing the original mesh into a volumetric grid, also known as a voxel representation. That is, the mesh may be represented by this voxel representation. For example, FIG. 6 illustrates the object of FIG. 3, that is, the sink, in a voxel representation. The resulting voxel representation may comprise filled voxels representing areas covered by mesh faces, and unfilled voxels representing areas not covered by mesh faces. The boundary of this voxel volume may be readily extracted to form a closed, well-formed manifold polygonal mesh that is suitable for intersection with a plane.

Polygonal meshes are boundary representations, and not solid, so may not be perfectly sealed. To account for this, enclosed voids in the initial voxelized representation may be filled in to produce a solid voxel volume. These enclosed voids are areas of unfilled voxels that are entirely surrounded by filled voxels. Filling them may, for example, be achieved by an automatic flood-fill process that classifies voxels as inside or outside the shape. Such a process might start with some seed voxels known to be outside (for example, the distant corners or borders of the grid). The process may iteratively mark as outside any unfilled voxels immediately adjacent to voxels already marked as outside, and so on, eventually marking as outside all unfilled voxels reachable from the seed voxels via only unfilled voxels. Any voxels not marked as outside during this process can be deduced to be inside the volume, and enclosed entirely by filled voxels. Therefore, these voxels can be filled as well.

In computer games, models of buildings and scenery are often left open at their lowest extents, where they are assumed to be hidden by the ground in their intended use within a 3D scene. In some embodiments, the filling of voids in the voxelized representation of the shape may account for this by treating any voxels below ground level (or any appropriate height) as filled, as required.

The 2D cross-section of the shape in a given plane may be computed by determining the intersection loops where the plane intersects the boundary of the object's voxelization. That is to say, the boundary of the collection of filled voxels. Whereas the original mesh may have not have been closed, or manifold, the boundary of the filled voxels, being the boundary of a well-defined volume, can always be extracted as a well-formed closed mesh suitable for intersection with a plane. A closed mesh may be desirable because it always forms simple, well-defined intersection loops where it crosses a plane.

In another example, the cross-sections may be computed directly against a voxel representation, without the need for an extracted boundary mesh. The cross-sections in this example might comprise points where the plane intersects boundary voxels. These points may be connected to form closed loops.

Figure 7:
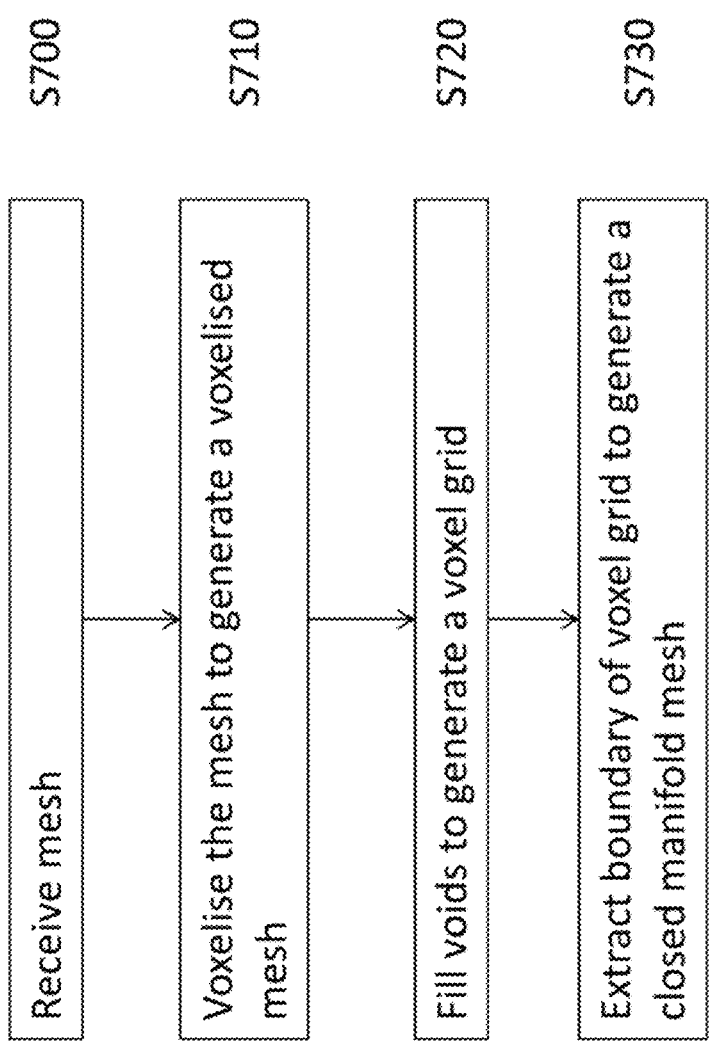
FIG. 7 is a flow chart illustrating a method of generating a closed manifold mesh according to embodiments of the present specification.

FIG. 7 is a flow diagram illustrating the steps involved in conforming a mesh to form a closed manifold mesh.

In step S700, a polygonal mesh is received.

In step S710, the processor is configured to voxelize the mesh. That is, voxels within a voxel grid are marked as filled wherever they intersect the polygons of the mesh. This step results in a voxelized representation in which filled voxels constitute a rasterized approximation of the original mesh.

In step S720, the processor is configured to fill the voids of the voxel grid, marking as filled any voxels that are entirely enclosed by other filled voxels.

In step S730, the processor is configured to extract the boundary of the voxel grid in order to generate a closed manifold mesh.

Figure 8:
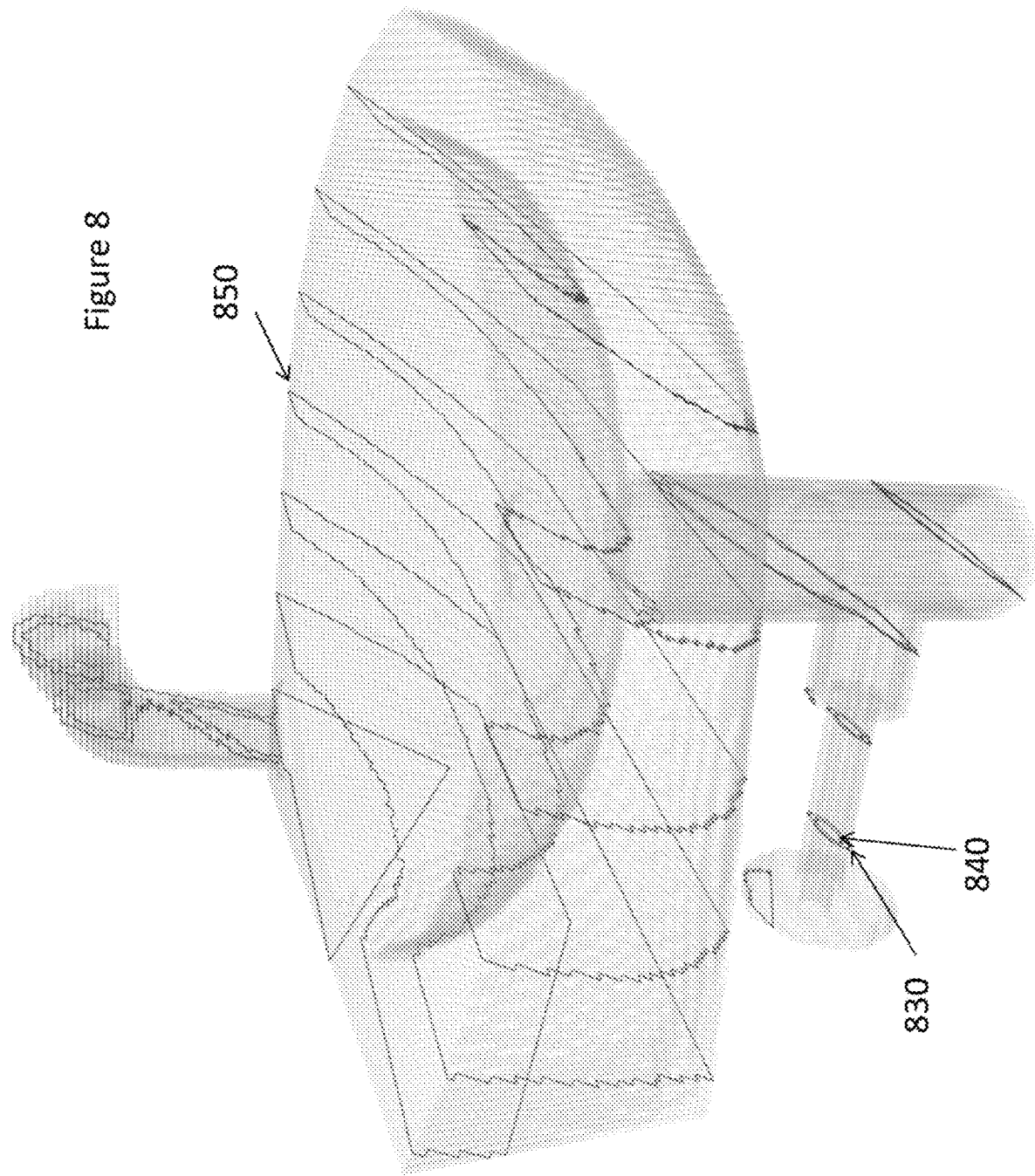
FIG. 8 is an illustration of intersection loops of an object.

The voxelized representation of the sink as shown in FIG. 6 may now be intersected by a plurality of planes to form intersection loops, and so determine the silhouette volume of the sink. FIG. 8 illustrates an example of the sink of FIG. 6 annotated with the intersection loops formed by intersection with a plurality of planes.

An intersection loop, such as intersection loop 512, is a loop formed by the points and lines where a plane intersects the boundary of the object. FIG. 8 illustrates an example where the object is the sink of FIGS. 3 and 6. In FIG. 8, a number of parallel intersection loops are formed based on intersection of the object with a plurality of parallel planes, spaced some distance apart. Therefore, the intersection loops illustrated in FIG. 8 are parallel to one another. The intersection loops formed depend on the axis and offsets of the planes in which the intersection loops are formed.

Figure 9:
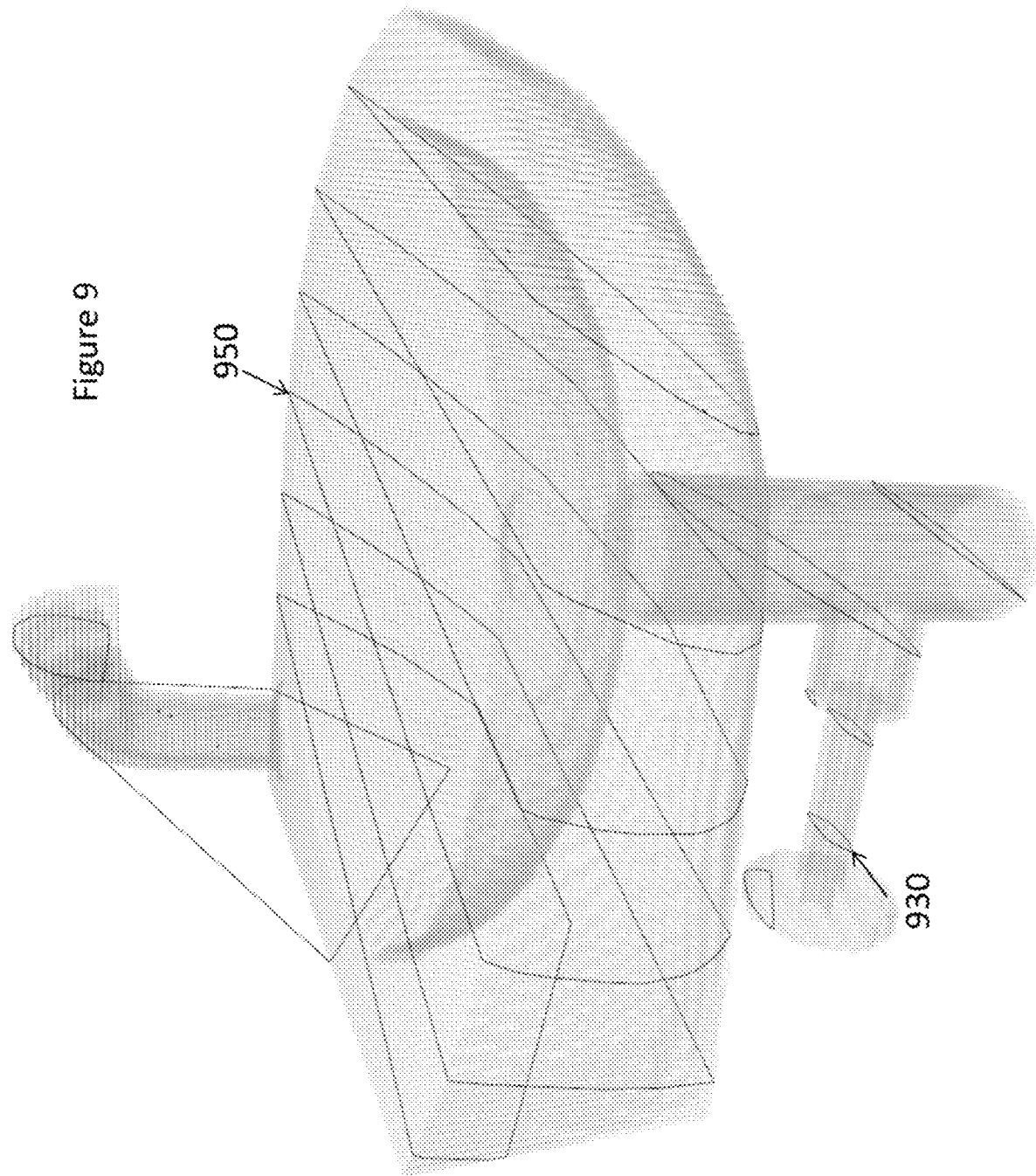
FIG. 9 is an illustration of hulled intersection loops of an object according to embodiments of the present specification.

FIG. 9 illustrates shows the convex hulls of the intersection loops formed by the plurality of parallel planes with the object. As can be seen in FIG. 9, the intersection loops of FIG. 8 have been hulled, in order to identify the boundary of the silhouette volume of the sink at a number of locations.

In the example of FIG. 8, there may be more than one intersection loop formed in a single plane. For example, a plane may pass through the basin and the drainage pipe, which may form two separate intersection loops. In addition, the drainage pipe is hollow, and therefore, a plane passing through the drainage pipe forms two intersection loops, one for the outer surface of the pipe, and a second for the internal surface of the pipe. This is illustrated in the example of FIG. 8.

The intersection loops can be projected from 3D to 2D along the axis that is the normal of the intersecting plane, without losing any information, as the points of the intersection loop all lie in the plane. Therefore, subsequent processing of the intersection loops can be performed entirely in 2D. This can be advantageous as calculations are simpler and utilize less processing resource in 2D than do corresponding calculations in 3D, and it is mathematically simpler to describe regions of an object as being convex, and points in the 2D plane as being inside or outside the convex hull of the shape.

The loops may be used to determine whether to reject points (where the points may correspond to voxels, for example) as outside the silhouette volume. A given point can be tested to determine whether it lies inside any of the hulled loops (e.g. the hulled loops of FIG. 9). This may be done, for example, using a 2D point-inside-convex-hull test, which exploits the fact that the hulls are convex. The 2D point-inside-convex-bull test is implemented as a software routine.

When using a set of intersection loops to reject points as outside the silhouette volume, this may be applied only for points which lie exactly on the plane containing the loops. Therefore, classifying all points accurately would require a large number of planes. This may be approximated instead by using the nearest plane to classify each point. This approximation may be performed if the planes are generally close together. The loops for all planes on a given axis may be stored in a data structure, then all unclassified points are processed in a single pass using the stored structure. Each point may be approximated as being on the nearest plane (where the distance from the center of the point from the chosen plane is minimized). The point is then projected onto the chosen plane, and the loops within that plane are tested to determine whether the point should be rejected as outside the silhouette volume.

In the example of FIG. 8, there are some planes in which multiple intersection loops are generated. Loops which are enclosed inside other loops can be discarded. Therefore intersection loop 840, which lies inside intersection loop 830, is discarded, and so on, resulting in the set of loops depicted in FIG. 9.

In order to determine whether a first loop (such as loop 840) lies inside a second loop (such as loop 830), the vertices of the first loop are tested to see whether any vertices lie inside the second loop. The testing is performed by a software routine. If any of the vertices of the first loop lie outside the second loop then logically all vertices of the first loop must lie outside the second loop. Testing for whether vertices of a first loop lie inside or outside another loop may be done using a standard point-in-polygon test (implemented as a software routine) using the sum-of-angles method. This test may also be known as computing the winding number or winding angle of the second loop around a vertex from the first loop. Degenerate cases where a vertex of the first loop lies approximately on a vertex or edge of the second loop may be handled by simply disregarding the vertex in favor of others where the relationship is unambiguous.

The remaining loops are hulled, that is, they are replaced with their convex hulls. In the case where multiple loops exist in the same plane, each loop is hulled (i.e. replaced by its convex hull) separately. That is, the hull of each loop is computed independently, rather than computing a single hull of all loops. Some of the loops in the example of FIG. 8 are already convex and so are identical to their individual corresponding hulls, for example, loop 830 when hulled is identical to hulled loop 930. That is, for such convex loops in the example of FIG. 8, the corresponding hulled loops in FIG. 9 are the same as the non-discarded loops themselves. However, for the loops which include concavities, such as loop 850 of FIG. 8, the convex hull removes the concavity of the hollow region of the basin, and so the convex hull differs from the corresponding intersection loop in this example.

Where multiple loops exist in a single plane, the individual hulls of the loop are used when generating the silhouette volume of the object, rather than the hull of all the loops together. That is, loops which lie in the same plane are hulled independently of each other.

The inner loops may be discarded as they represent internal concavities in the outer loop, which do not affect the convex hull. Therefore, they do not affect the silhouette of the object and so are not useful in determining the silhouette vertices of the object.

In some examples, the degree to which features are silhouette may be determined according to a silhouette field which indicates the distance of a point from the silhouette of the object. In order to determine this, a silhouette volume may be computed to determine the 3D region of space critical to the silhouette of the object.

In some examples, the silhouette volume may be computed in approximate, discretized form within a voxel grid. In these examples, filled voxels may represent regions of space comprising the silhouette volume. Such a method may begin by initially assuming that all voxels are inside the silhouette volume, and then classifying specific voxels as outside the silhouette volume, that is those voxels which do not lie within the silhouette volume. This classification may proceed iteratively, repeatedly computing multiple planar cross-sections on a number of different axes and then using the 2D convex hulls of the resulting projected intersection loops to reject voxels that lie on the intersection planes, but outside the respective hulls in that plane, as also outside the silhouette volume. Within each intersecting plane, the hulled intersection loops serve to classify all points that lie in the plane, but not within any of the hulls in that plane, as also outside the silhouette volume of the 3D shape. In cases where the number of planes is small, voxels may be projected onto their nearest plane, and the hulls within that plane used for rejection.

FIGS. 8 and 9 illustrate a plurality of intersection loops and hulled loops respectively of a number of parallel planes. In accordance with the method described below, a further plurality of intersection loops and hulled loops are determined for a further plurality of parallel planes along a different axis to the first group of parallel planes, repeatedly. This may enable more and more voxels to be progressively classified as outside the silhouette volume of the object, by successive classifications, each using a plurality of planes on one of a series of successive different axes. After repeated rounds of classification on a sufficient range of different axes, when all voxels lying outside the silhouette volume of the 3D object have been classified as such, to within a reasonable degree of accuracy, all remaining voxels may be classified as inside.

Figure 10:
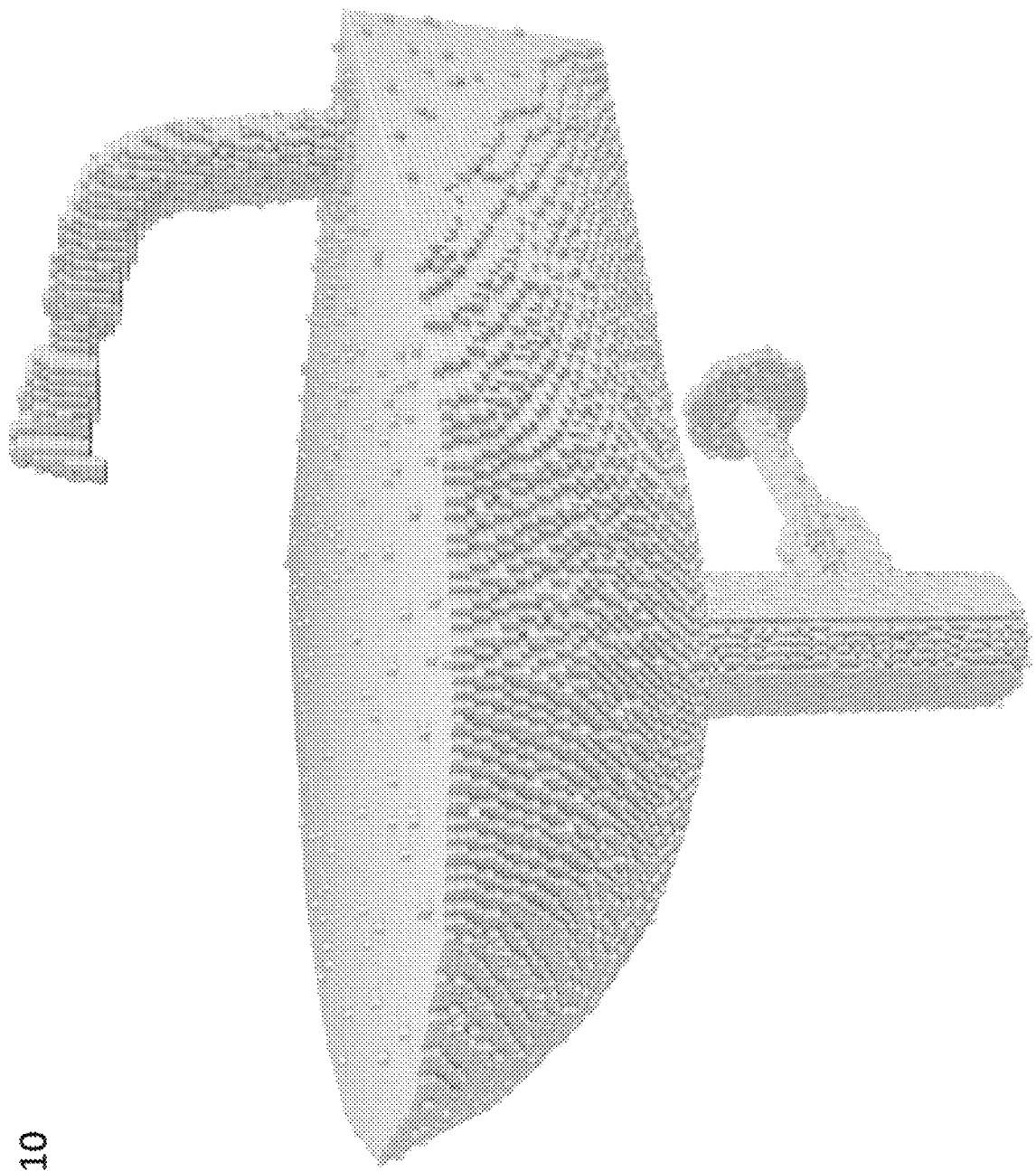
FIG. 10 is an illustration of a silhouette volume according to embodiments of the present specification.

An example of the silhouette volume generated using the hulled loops of FIG. 9 is illustrated in FIG. 10. The silhouette volume as shown in FIG. 10 is generated using repeated elimination of outside voxels, using many planes on each of a succession of different axes. As can be seen from the hulled intersection loops in FIG. 9, the convex hulls of the intersection loops of a single plane in the region of the tap do not accurately reflect the silhouette of the object and therefore do not alone serve to classify all appropriate voxels as outside. However, after performing a number of similar rejections of points, using different sets of intersection loops generated in different planes along different axes, sufficient voxels may be rejected as outside so as to resolve the silhouette volume's shape to any required degree of accuracy. Increasing the number of axes on which intersection loops are computed may therefore generate a more accurate rendition of the true silhouette volume, more closely capturing the silhouette of the object.

In some examples according to the present disclosure, determining a silhouette volume can be expressed using the following pseudocode:
1. Initially assume every 3D point is inside the silhouette volume of an object O
2. Generate a set of non-parallel projection axes
3. For each axis A in the set of projection axes
   a. Generate a series of parallel planes perpendicular to axis A, and at different offsets
   b. For each plane P in the series of planes
     i. Generate a set of intersection loops identifying where P intersects the boundary of object O
     ii. Project the set of intersection loops to 2D in plane P
     iii. Discard any projected loop that is enclosed in another loop in 2D
     iv. Replace all remaining loops with their convex hulls in 2D
   c. For each 3D point X not yet classified as outside the silhouette volume
     i. Find the plane R to which point X is nearest
     ii. Project point X to 2D in the plane R
     iii. If the projection of X is outside all hulled loops in plane R
       1. Classify X as outside the silhouette volume
4. Any points not classified as outside are deduced to lie within the silhouette volume.

Figure 11:
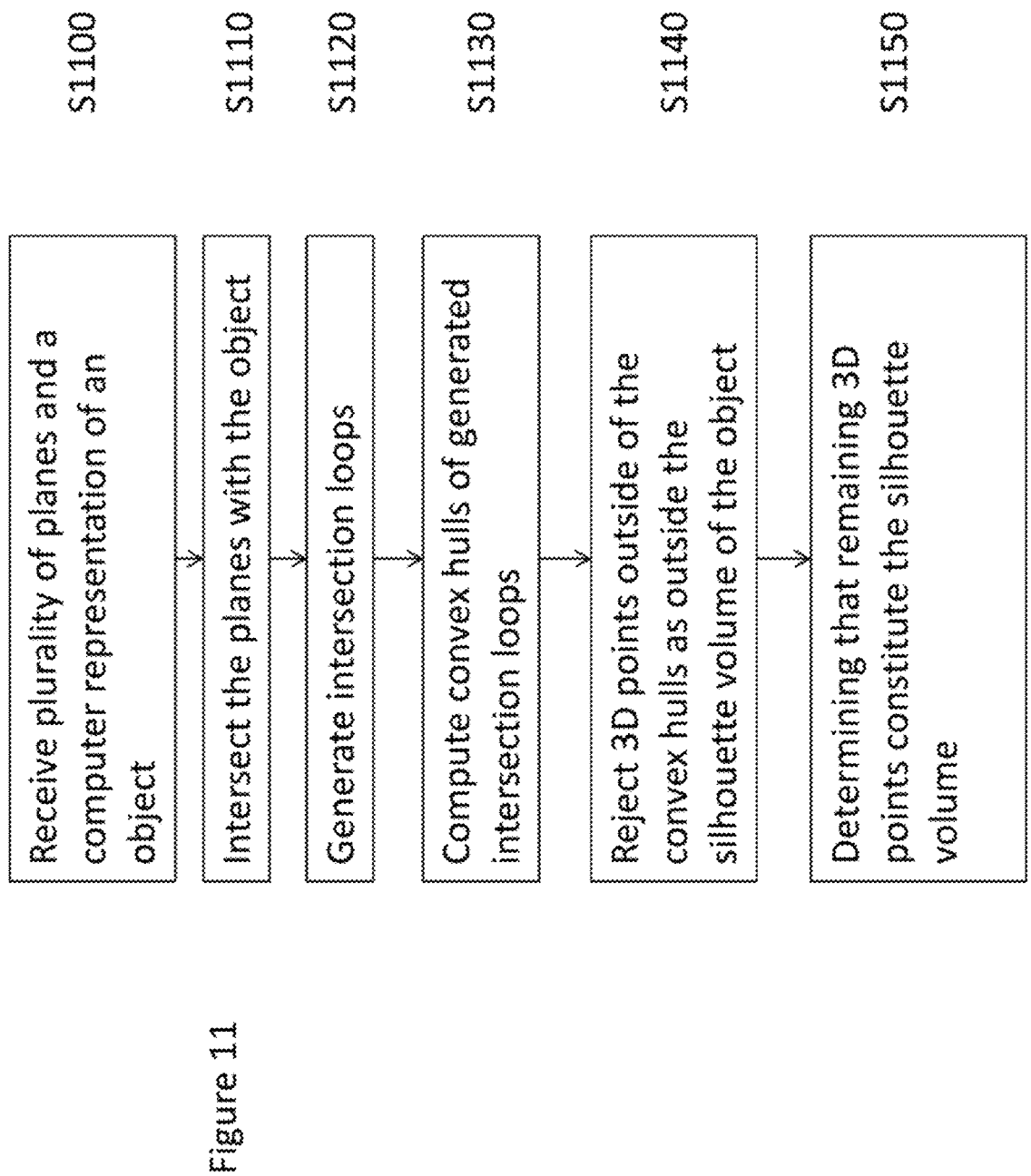
FIG. 11 is a flow chart illustrating a method of generating a silhouette volume of an object according to embodiments of the present specification.

Computer program code corresponding to the steps set out in the above pseudocode may be stored on a computer readable medium, and may be executed by a processor which performs the method. The method expressed in the above pseudocode is now discussed herein in more detail, and with reference to the flow diagram illustrated in FIG. 11.

In an initial step, the processor is configured to assume that every 3D point is located inside the silhouette volume of an object. An initial classification of all points in an encompassing region of space may be performed such that all points are classified, at first, as inside the silhouette volume of the object.

In step S1100, the processor is configured to receive a plurality of planes. In addition, if the computer representation of the object is a mesh, then the processor is configured to receive a closed manifold mesh.

The plurality of planes may be generated by the processor. For example, the processor may be configured to generate a set of non-parallel projection axes. The axes may be generated at a number of different 3D angles with respect to the object, where none of the axes are parallel to any other generated axis. The number of generated axes may be any suitable number, and for example may be balanced so as to minimize computational burden while ensuring that sufficient detail is captured in the resulting voxel-based approximation of the silhouette volume. A typical number of axes might be around a hundred, but it will be understood that this may vary according to use.

For each axis, the processor may be configured to determine a number of parallel planes which are perpendicular to the given axis, and spaced out regularly or irregularly at different offsets along the axis. That is, the parallel planes may be spaced apart from one another by a given fixed amount, or may be clustered around specific areas of interest. The distance of the spacing between planes may be determined based on the number of parallel planes, for example, to provide a regular sampling of the space. Alternatively the number of planes may be determined based on the size and/or resolution of the object, or the size and/or resolution of the voxel grid, or the global or local complexity of the object. In general any suitable scheme chosen by the skilled person may be used.

In step S1110, the processor is configured to intersect the plurality of planes with the object. For example, when the object is represented by a mesh, the processor is configured to intersect the plurality of planes with the closed manifold mesh.

In step S1120, the processor is configured to generate intersection loops. That is, for each plane, the processor is configured to determine the intersection locations of each plane with the object. Each intersection loop is essentially an extracted cross-section of the boundary of the object in the plane.

The processor may be configured to project the determined intersection loop into 2D in the given plane. By projecting the intersection loop into a 2D plane, the proceeding calculations may be more straightforward for the processor to process compared to a 3D object.

Any intersection loop which is determined to be located within another intersection loop is discarded by the processor.

In step S1130, the processor is configured to compute the planar convex hulls of the generated intersection loops. The convex hull of each undiscarded loop is determined, and the convex hull replaces the intersection loop for further computation.

In step S1140, the processor may be configured to reject specific 3D points as being outside the silhouette volume of the object. This rejection may be performed one plane at a time, rejecting any points in the plane that lie outside the hulled intersection loops in that plane as outside the silhouette volume. Alternatively, some implementations may reject multiple points, using multiple planes, and even on multiple axes, at once. In one example, the intersection loops in all planes on a single axis may be built, then hulled, and stored in a data structure. Then all points not yet classified as outside the silhouette volume may be tested, each using the stored hulls of one or more planes, and rejected if they lie outside all of the hulls within those planes.

The 3D points may be received as a voxel grid, in some examples. Alternatively, the points might correspond to features or vertices of some existing mesh based approximation of the silhouette volume, to be iteratively improved.

When testing a point, the processor may be configured to use the hulls in the plane which is geometrically nearest to the point. That is, the 3D point may be compared to the parallel planes to determine which plane is located nearest, and the point may be treated as if it were located in that plane. Once the plane nearest to the given 3D point is determined, the point is projected to 2D in the plane. That is, the point in the plane that is nearest to the 3D point is determined, and the 2D location in the plane of that nearest point is used.

The position of the projected point in relation to the hulled loops of the chosen plane or planes is determined. In particular, the processor is configured to determine whether the projection of the 3D point is outside each of the hulled loops present in each plane. If the projection of the 3D point is outside each of the hulled loops, then the point is classified as being outside the silhouette volume of the whole object.

In step S1150, any 3D points which are not previously rejected as outside the silhouette volume are determined to lie within, or on the boundary of, the silhouette volume. The points which are not rejected constitute the silhouette volume. Thus, by determining the 3D points or voxels which are within the convex hulls, a silhouette volume of the object is generated.

Referring again to FIG. 10, FIG. 10 illustrates a silhouette volume represented by filled voxels, specifically those voxels determined to be within the silhouette volume in accordance with the method described above. As can be seen, the concavity of the basin is filled in by the voxels as this concavity is not a feature of the silhouette, whereas the region between the bottom of the basin and the drainage pipe is not filled, as sight lines are able to pass through this region.

However, it will be understood that any other suitable method of determining the silhouette volume may be used which may be apparent to the skilled person.

For example, instead of computing the silhouette volume of a shape within a voxel grid, the method may act on an initial mesh representing the input shape by repeatedly filling in local concavities whose internal regions are determined to be hidden in silhouette. Simple concave features of objects may be filled in, in order to compute silhouette volumes. Concave features that sight lines cannot pass through (e.g. the concavity including the block 511 in the shape 510 from FIG. 5) may be filled whereas, in contrast, the concavities which sight lines can pass through (e.g. the U shape of the object 520 in FIG. 5) may be retained. In the example of the sink in FIG. 9, the concavity in the main body of the sink basin is filled, as sight lines do not pass through this portion, but the concavity between the sink basin and the drainage pipe below is not filled, as sight lines pass through this concavity. Features to be removed may, for example, be determined by identifying suitable concave features as areas of concave (or planar) edges bounded by rings of convex (or planar) edges.

For the points inside the silhouette volume, such as the silhouette volume illustrated by FIG. 10, a silhouette field may be determined in order to establish how far from the boundary of the silhouette volume, and hence bow non-silhouette, the points may be. The silhouette field may also represent points outside the silhouette volume. The silhouette field may be represented by a signed distance field indicating distances of arbitrary points from the boundary of a silhouette volume. The silhouette field may be determined such that negative distances represent distances of points which are located inside the silhouette volume, but the sign notation may of course be reversed.

The silhouette field may in some instances be represented as a voxel grid whose cells contain signed distance values. FIG. 10 illustrates a number of voxel grids representing the silhouette field at a number of different signed distance values.

Figure 12:
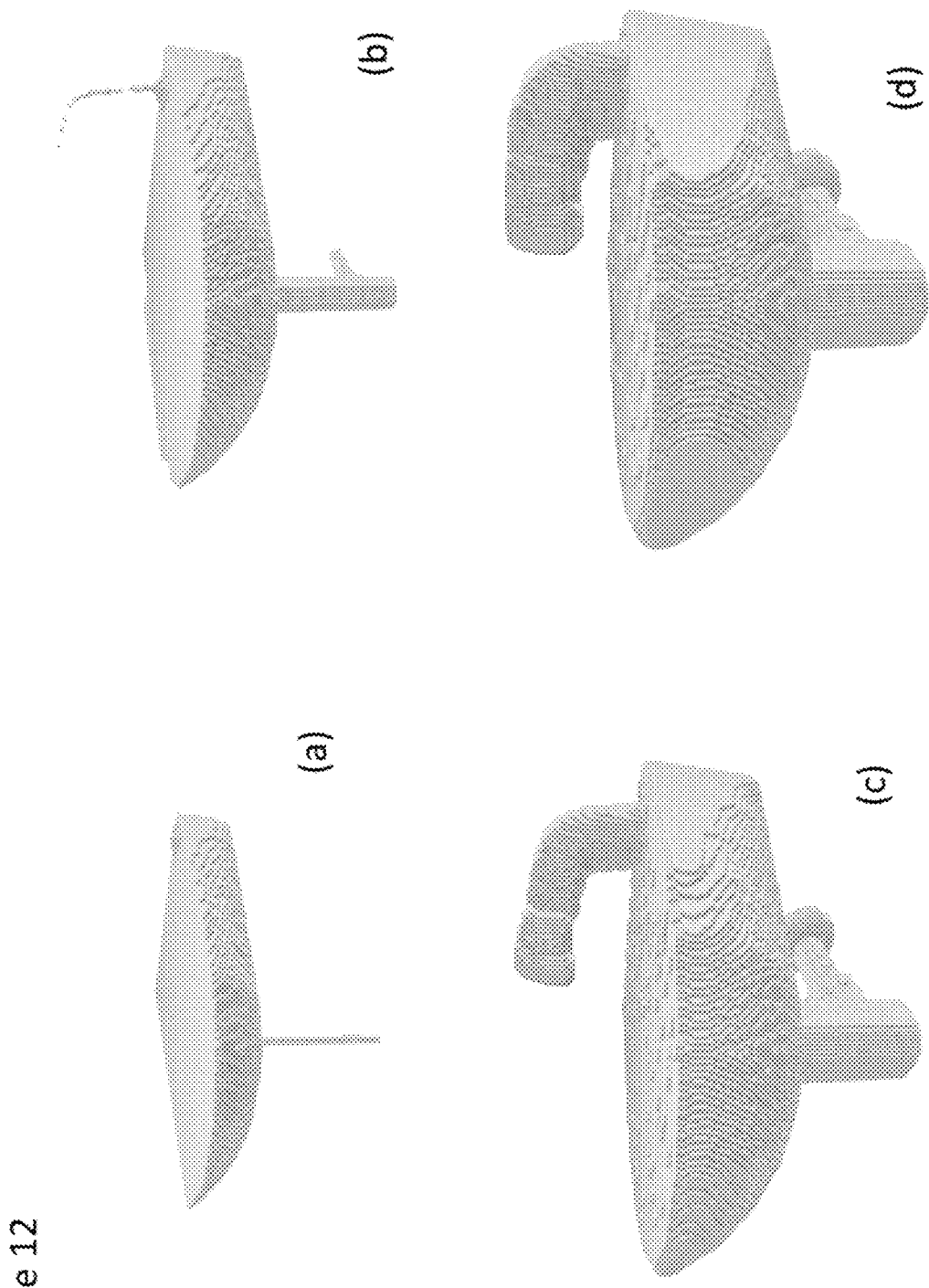
FIG. 12 is an illustration of a silhouette field of an object at different distances from the silhouette volume boundary.

In image (a) of FIG. 12, the voxel grid illustrates an illustration of the silhouette field showing all voxels with a distance value of −10 or less. That is to say, all voxels inside the silhouette volume and located at least a distance of 10 units away from its boundary. The units in this case are in cm, however any suitable units, including the voxels themselves, may be used. The set of voxels within a distance field whose distances lie at a certain distance, or within a certain range, may be referred to as a level set.

In image (b) of FIG. 12, the silhouette field is illustrated again, this time showing all voxels with a distance value less than or equal to −5. Image (c) of FIG. 12 illustrates the silhouette field at a value of +5. Finally, image (d) of FIG. 12 illustrates the silhouette field at a value of +10. The set of voxels shown in this instance includes all voxels inside the silhouette volume and all those outside but located ten or less units from the boundary.

Therefore, the silhouette field may be treated as indicating the distance of mesh features from the boundary of the silhouette volume, and hence the degree to which features are not silhouette.

The silhouette field may then be used to generate a silhouette map, indicating the distance of the vertices or features of a mesh from its silhouette, and hence the degree to which they are (non-)silhouette.

Figure 13:
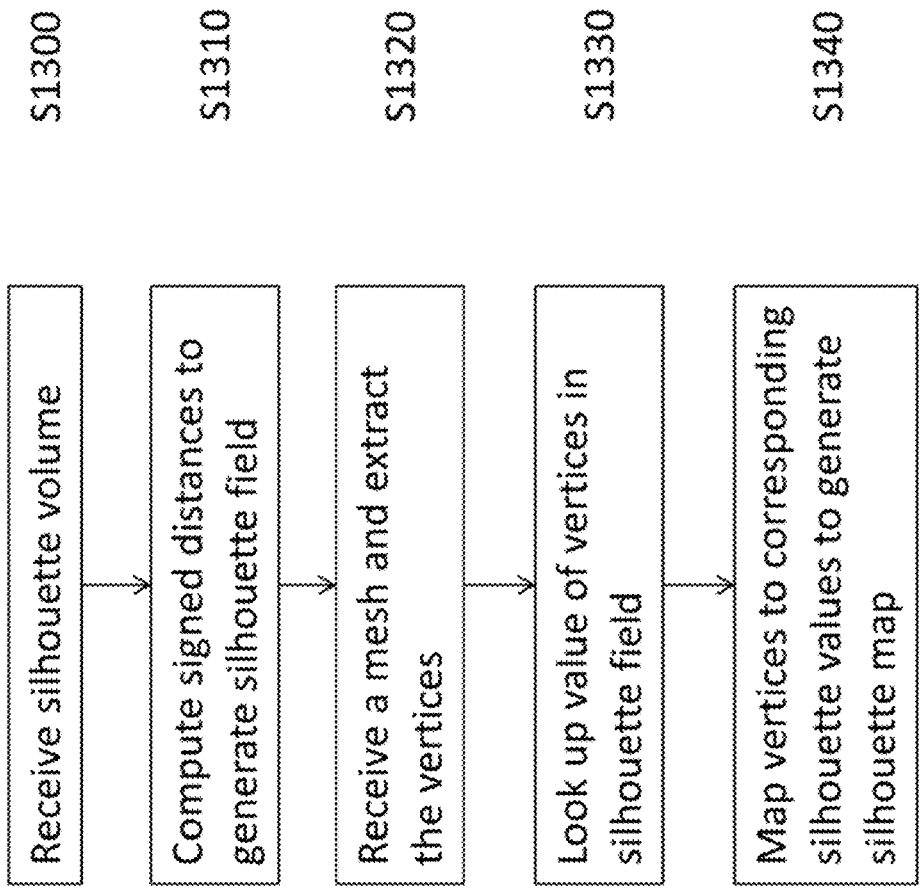
FIG. 13 is a flow chart illustrating a method of generating a silhouette map.

FIG. 13 is a flow diagram illustrating operations involved in generating a silhouette map.

In step S1300 a silhouette volume is received. The silhouette volume is determined in any suitable way, including the methods described above.

In step S1310, the processor is configured to compute signed distances. The signed distances are relative to the boundary of the silhouette volume, as described above. The signed distances computed are used to generate the silhouette field which indicates the distance of any point within an enclosing space, or field, from the boundary of the silhouette volume.

In step S1320, the processor is configured to receive a mesh corresponding to the object, and to extract the vertices of the mesh.

In step S1330, the value of the silhouette field is determined for each vertex by looking up the value of the silhouette field at the location of the vertex. In this respect, the silhouette field may be considered to be a "look up" table, where the silhouette field indicates the distance from the boundary of the silhouette volume at the location of a given vertex.

In step S1340, the vertices are mapped to the corresponding silhouette values in order to generate a silhouette map which associates with each mesh vertex (or other feature) a numerical value indicating the degree to which the vertex (or feature) is silhouette. The silhouette map may be generated by querying the silhouette field at the 3D points where the vertices are located.

The value of the silhouette field at the location of a vertex gives a hint as to the degree to which the vertex is silhouette. Vertices of a mesh are typically either inside its silhouette volume or on its boundary, by definition (subject only to the inaccuracy with which the silhouette volume is computed). Hence the silhouette field values at the vertex points are either zero or negative (assuming negative distances are used by convention for points inside the silhouette volume, as in some embodiments). Increasingly negative distances are associated with vertices buried increasingly deeply inside the silhouette volume, away from its boundary. Hence the magnitude of the silhouette field value at a vertex can be used to compute a silhouette map value indicating, in simple numerical form, the proximity of the vertex to the silhouette volume boundary and hence the importance of the vertex to silhouette fidelity. For a given vertex, the less negative the value of the silhouette field at the location of the vertex, the more important it is to silhouette the vertex. The degree of silhouetteness of features decreases with increasing negative value of the silhouette field. By mapping a well-chosen range of signed distances to a useful numerical interval (for example, between zero and one), and clamping out-of-range values as appropriate, embodiments may compute a per-vertex silhouette map that usefully characterizes the silhouette and non-silhouette areas of a mesh by means of computed per-vertex scalar values.

A computed silhouette map may be used within mesh simplification to aid in preservation of silhouette features. This may be achieved by using the per-vertex (or per-feature) silhouette map values in a compound cost metric for mesh simplification. The metric may therefore include a specialized silhouette metric term (or factor) which attributes a lower cost to simplification operation candidates that simplify or alter non-silhouette features, compared to those that alter silhouette features. That is, the silhouette metric term penalizes alterations or simplifications of silhouette features. As a result, during simplification, the silhouette features are better preserved in the simplified version at the expense of fidelity in areas that are not important to the silhouette. The skilled person may adapt the silhouette metric term in order to determine the extent to which silhouette features may be preserved over non-silhouette features during mesh simplification.

The simplification operations performed, for example the edges of the mesh to be collapsed, during simplification may be determined according to a compound cost metric which may take into account a number of considerations. The cost metric may include a number of terms, factors, or similar, which together quantify the cost, to visual fidelity, of mesh simplification operations. Among these, the cost metric may include a silhouette metric term in order to penalize with higher cost any operations that would alter silhouette features of the mesh. In addition, the metric may comprise an overshadowing term or factor, designed to penalize simplifications which would result in overshadowing, and described in more detail below.

The identification of silhouette features may be useful during simplification in order to detect and prevent overshadowing. Overshadowing occurs when a simplified mesh casts a shadow in places where the original mesh did not cast a shadow. For example, some simplified meshes may cut across a hole such as window or arch, thus obscuring the original view through the hole. An example of this can be seen in FIG. 14. Image (a) of FIG. 14 illustrates the original mesh, through which a viewer can see through window 1400a. In image (b) however, the simplified mesh has cut across the window such that the view through the window 1400b is obscured. In order to address this, embodiments described herein may introduce a specialized overshadowing term into the metric which applies a cost penalty to changes that would move points away from the silhouette volume and would thus lead to overshadowing during simplification. Therefore, the weighting of these vertices around the window may be determined to be greater than other non-silhouette vertices.

Image (c) of FIG. 14 illustrates a mesh simplified from the input mesh of image (a), wherein the mesh has been simplified in accordance with embodiments of the present disclosure, including making use of an overshadowing term which penalizes mesh collapses which would lead to over shadowing. Therefore, the shape of the window is preserved compared to the example of image (b), causing the view through the window 1400(c) to remain largely unobscured in comparison to the simplified mesh of image (b). As can be seen, visual fidelity is lost in the region of the windowsill, for example, but is comparably preserved in the region surrounding directly surrounding the window, such that the shape of the window is preserved.

In some embodiments in accordance with the present disclosure, some of the simplified objects may be generated only for casting shadows. In this example, the meshes may be simplified by removing substantially all the features inside the mesh, while preserving the silhouette of the object. This is because in the case of the shadow, the most important features which are needed are the silhouette features.

Figure 15:
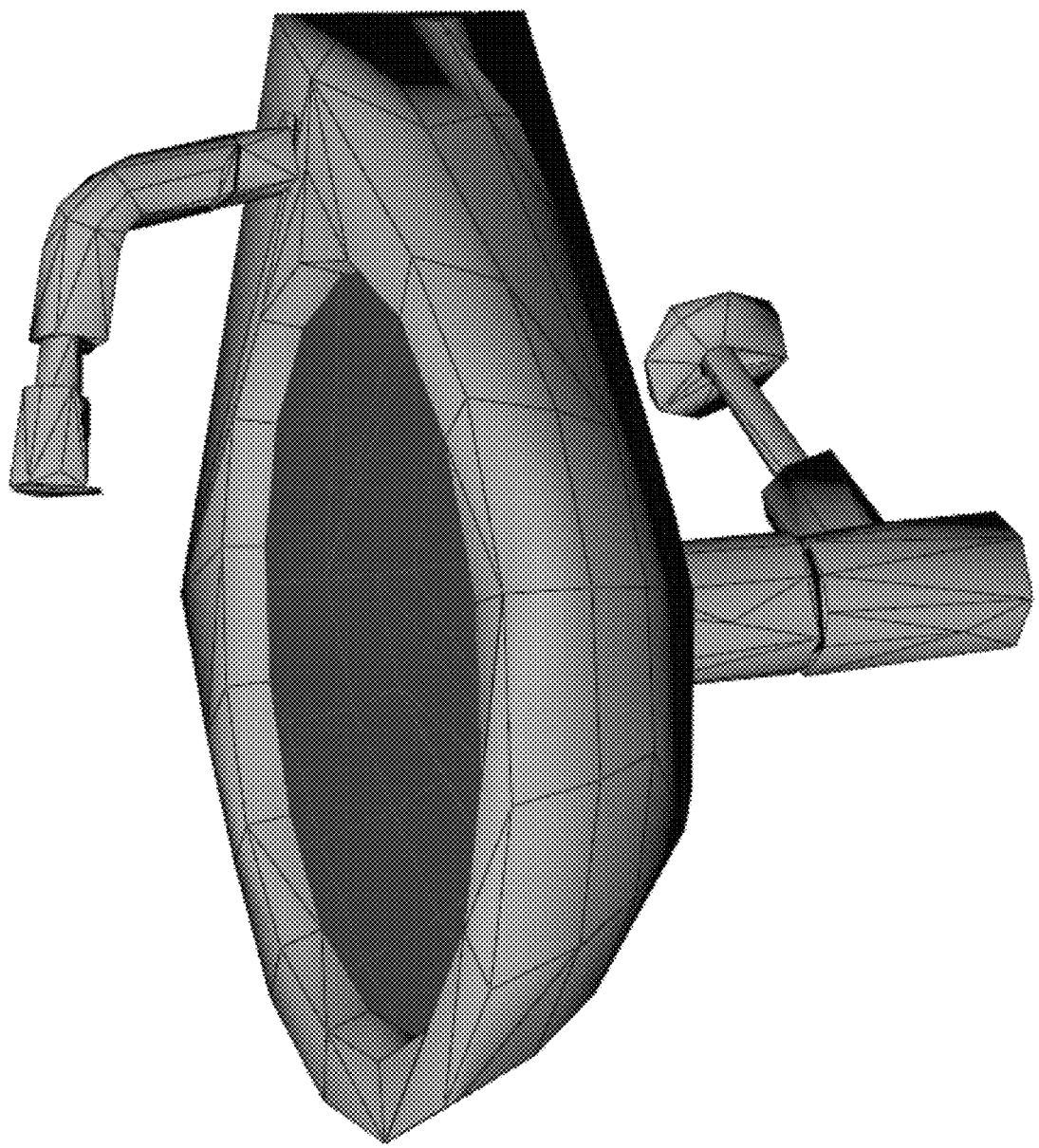
FIG. 15 is an illustration of a shadow mesh generated according to embodiments of the present specification.

FIG. 15 illustrates an example of a mesh which is simplified by removing the non-silhouette features. The mesh has been simplified with respect to the mesh of FIG. 1, image (a), for example. The simplified mesh of FIG. 15 may be used for the purpose of casting shadows, as the non-silhouette features are not of importance to a generated shadow. Note that in the illustration the removed non-silhouette parts are not shown, and instead are visible by the dark rear sides of the faces on the outside of the sink on the opposite side.

In a computer animation setting, the preservation of silhouette features helps to prevent objects which are viewed as though they are far away from appearing distorted. That is, because silhouette features are better preserved at the expense of fidelity in non-silhouette areas, the visual fidelity of the mesh may appear greater when viewed from a distance compared to a mesh where the silhouette features are not preserved over non-silhouette features. Furthermore, because differences in the silhouettes of successively simpler versions of objects may be especially noticeable when switching between them during animation, the visual fidelity of animation may be improved by reducing simplification of silhouette areas in simplified versions. The reduced simplification of silhouette areas may also be useful in the generation of shadow meshes, used for casting shadows as described above.

As also described, overshadowing may be prevented, and so in a computer animation setting, the meshes simplified in accordance with embodiments of the specification may maintain regions through which sight lines can pass, such that the view through an opening such as a window is not obscured by the simplified mesh cutting across the window opening.

Figure 16:
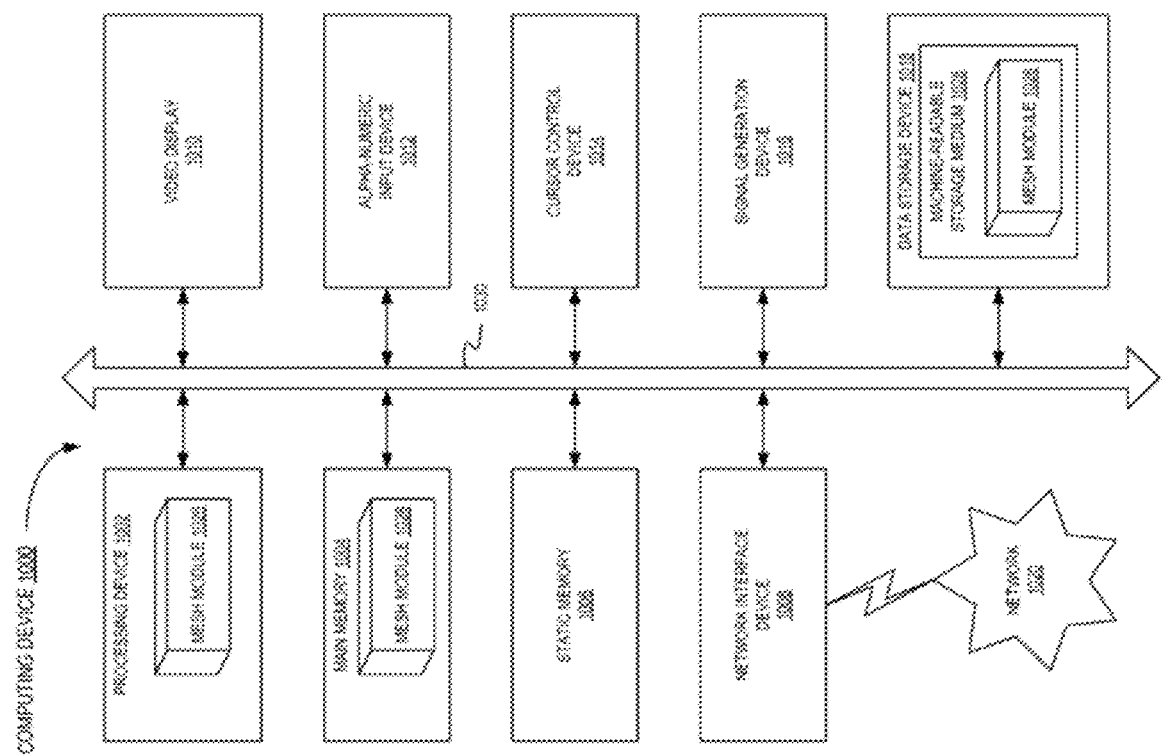
FIG. 16 is an illustration of a computing device for performing processes according to embodiments of the present specification.

FIG. 16 illustrates a diagrammatic representation of a computing device 1400 within which a set of instructions, for causing the machine to perform any one or more of the methodologies discussed herein, may be executed. The computing device 1400 may be a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 700 includes a processing device (e.g., a processor) 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)) and a data storage device 1418, which communicate with each other via a bus 1430.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 1402 is configured to execute mesh module 1426 for performing the operations and steps discussed herein.

The computing device 1400 may further include a network interface device 1408 which may communicate with a network 1420. The computing device 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse) and a signal generation device 1416 (e.g., a speaker). In one embodiment, the video display unit 1410, the alphanumeric input device 1412, and the cursor control device 1414 may be combined into a single component or device (e.g., an LCD touch screen).

The data storage device 1418 may include a computer-readable storage medium 1428 on which is stored one or more sets of instructions (e.g., instructions of simplification module 1426) embodying any one or more of the methodologies or functions described herein. The simplification module 1426 may also reside, completely or at least partially, within the main memory 1404 and/or within the processing device 1402 during execution thereof by the computing device 1400, the main memory 1404 and the processing device 1402 also constituting computer-readable media. The instructions may further be transmitted or received over a network 1420 via the network interface device 1408.

While the computer-readable storage medium 1428 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," "reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have a ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, performed by one or more processors, the method comprising:

receiving a computer representation of a 3D object;

determining a silhouette volume of the 3D object, wherein the silhouette volume is a maximal volume of space having, for each out of every viewing direction, a silhouette which is identical to a silhouette of the 3D object from that viewing direction, and wherein points of the 3D object which lie on a boundary of the silhouette volume also lie on a boundary of the 3D object's projected silhouette from at least one viewing direction;

determining, based on the silhouette volume, an extent to which features of the 3D object are silhouette features; and performing a simplification process based on a cost metric which determines negative impact to visual fidelity of the 3D object of an available simplification operation, the cost metric including a term or factor to penalize simplification changes which affect the silhouette features of the 3D object to a greater extent than changes which affect non-silhouette features of the 3D object.

2. A method according to claim 1, further comprising determining the boundary of the silhouette volume, wherein determining the boundary of the silhouette volume comprises:
determining intersection loops for a plurality of planes and for a plurality of different axes, wherein each intersection loop corresponds to a planar cross-section of the boundary of the 3D object in its respective plane; and
determining the convex hull of each intersection loop.

3. A method according to claim 2, comprising:
classifying any 3D points which are located in or near a given plane, yet outside the convex hulls of the intersection loops formed within that plane, as being outside the silhouette volume; and
determining that any points not classified as outside the silhouette volume form part of the silhouette volume.

4. A method according to claim 1, wherein determining the extent to which features of the 3D object are silhouette features comprises determining a distance of a feature from the boundary of the silhouette volume.

5. A method according to claim 1, wherein determining the extent to which features of the 3D object are silhouette features comprises generating a signed distance field indicating a distance of 3D points from the boundary of the silhouette volume.

6. A method according to claim 1, comprising determining priority weightings for features of the 3D object, wherein the priority weightings determined for features located on the silhouette of the 3D object are determined to be higher than features which are not located on the silhouette of the 3D object.

7. A method according to claim 6, comprising performing the simplification process on the 3D object based on the priority weightings applied to the features of the 3D object.

8. A method according to claim 1, wherein the computer representation of the 3D object comprises a polygonal mesh.

9. A method according to claim 8, wherein identifying features of the 3D object which are located on the silhouette of the 3D object comprises:
identifying mesh faces, edges and/or vertices which are located on the boundary of the silhouette volume of the 3D object.

10. A method according to claim 9, wherein determining the extent to which features of the 3D object are silhouette features comprises determining distances of vertices, edges or faces of the polygonal mesh from the boundary of the silhouette volume of the 3D object.

11. A method according to claim 1, wherein determining the silhouette volume of the 3D object comprises:
generating a set of non-parallel projection axes;
for each axis A in the set of projection axes:
generating a series of parallel planes perpendicular to axis A at different positions along the axis A;
for each plane P in the series of parallel planes:
generating a set of intersection loops indicative of where plane P intersects the boundary of the 3D object;
projecting the set of intersection loops to 2D in plane P;
discarding any projected loop enclosed within any other loop in 2D;
replacing all remaining loops with their corresponding convex hulls in 2D;
for each 3D point X not yet classified as outside the silhouette volume:
finding a plane R to which 3D point X is nearest;
projecting 3D point X to 2D in plane R; and
if the projection of 3D point X to 2D in plane R is located outside all convex hulls of the intersection loops in plane R, classifying 3D point X as outside the silhouette volume of the 3D object;
determining that any 3D points not classified as outside the silhouette volume of the 3D object as forming part of the silhouette volume of the 3D object.

12. A method according to claim 1, comprising determining whether changes to the 3D object performed during a simplification operation would move points of the 3D object outside of the silhouette of the 3D object, and penalizing such changes to reduce chances of selection of such changes relative to other changes which do not move points of the 3D object outside of the silhouette of the 3D object.

13. A method according to claim 1, wherein determining the silhouette volume of the 3D object comprises representing the 3D object as a volumetric grid, and filling any unfilled regions of the volumetric grid that are completely enclosed by filled regions with filled voxels to produce a solid voxel volume;
extracting the boundary of the solid voxel volume as a closed mesh;
intersecting the boundary of the solid voxel volume with a plurality of 2D planes to form a plurality of intersection loops;
computing the convex hulls of the intersection loops;
determining the filled voxels which lie near one of the 2D planes yet outside the convex hulls of the plane;
determining that the remaining voxels are within or on the boundary of the silhouette volume of the 3D object.

14. A method, performed by one or more processors, the method comprising:
receiving a computer representation of a 3D object;
determining a silhouette volume of the 3D object, wherein the silhouette volume is a maximal volume of space having, for each out of every viewing direction, a silhouette which is identical to a silhouette of the 3D object from that viewing direction, and wherein points of the 3D object which lie on a boundary of the silhouette volume also lie on a boundary of the 3D object's projected silhouette from at least one viewing direction;
determining, based on the silhouette volume, an extent to which features of the 3D object are silhouette features; and
determining whether changes to the 3D object performed during a simplification operation would move points of the 3D object outside of the silhouette of the 3D object, and penalizing such changes to reduce chances of selection of such changes relative to other changes which do not move points of the 3D object outside of the silhouette of the 3D object.

15. A method according to claim 14, wherein determining the silhouette volume of the 3D object comprises:
generating a set of non-parallel projection axes;
for each axis A in the set of projection axes:
generating a series of parallel planes perpendicular to axis A at different positions along the axis A;
for each plane P in the series of parallel planes:
generating a set of intersection loops indicative of where plane P intersects the boundary of the 3D object;

projecting the set of intersection loops to 2D in plane P;

discarding any projected loop enclosed within any other loop in 2D;

replacing all remaining loops with their corresponding convex hulls in 2D;

for each 3D point X not yet classified as outside the silhouette volume:

finding a plane R to which 3D point X is nearest;

projecting 3D point X to 2D in plane R; and if the projection of 3D point X to 2D in plane R is located outside all convex hulls of the intersection loops in plane R, classifying 3D point X as outside the silhouette volume of the 3D object;

determining that any 3D points not classified as outside the silhouette volume of the 3D object as forming part of the silhouette volume of the 3D object.

16. A method according to claim 14, wherein determining the extent to which features of the 3D object are silhouette features comprises determining a distance of a feature from the boundary of the silhouette volume.

17. A method according to claim 14, wherein the computer representation of the 3D object comprises a polygonal mesh.

18. A method according to claim 17, wherein identifying features of the 3D object which are located on the silhouette of the object comprises:

identifying mesh faces, edges and/or vertices which are located on the boundary of the silhouette volume of the 3D object.

19. A method according to claim 14, wherein determining the silhouette volume of the 3D object comprises representing the 3D object as a volumetric grid, and filling any unfilled regions of the volumetric grid that are completely enclosed by filled regions with filled voxels to produce a solid voxel volume;

extracting the boundary of the solid voxel volume as a closed mesh;

intersecting the boundary of the solid voxel volume with a plurality of 2D planes to form a plurality of intersection loops;

computing the convex hulls of the intersection loops;

determining the filled voxels which lie near one of the 2D planes yet outside the convex hulls of the plane;

determining that the remaining voxels are within or on the boundary of the silhouette volume of the 3D object.

20. A method, performed by one or more processors, the method comprising:

receiving a computer representation of a 3D object;

determining a silhouette volume of the 3D object, wherein the silhouette volume is a maximal volume of space having, for each out of every viewing direction, a silhouette which is identical to a silhouette of the 3D object from that viewing direction, and wherein points of the 3D object which lie on a boundary of the silhouette volume also lie on a boundary of the 3D object's projected silhouette from at least one viewing direction;

determining the boundary of the silhouette volume, wherein determining the boundary of the silhouette volume comprises:

determining intersection loops for a plurality of planes and for a plurality of different axes, wherein each intersection loop corresponds to a planar cross-section of the boundary of the 3D object in its respective plane; and determining the convex hull of each intersection loop;

classifying any 3D points which are located in or near a given plane, yet outside the convex hulls of the intersection loops formed within that plane, as being outside the silhouette volume;

determining that any points not classified as outside the silhouette volume form part of the silhouette volume; and determining, based on the silhouette volume, an extent to which features of the 3D object are silhouette features.

* * * * *